United States Patent
Hingne et al.

(10) Patent No.: US 12,205,062 B2
(45) Date of Patent: Jan. 21, 2025

(54) CROSS-TENANT DATA PROCESSING FOR AGENT DATA COMPARISON IN CLOUD COMPUTING ENVIRONMENTS

(71) Applicant: NICE LTD., Ra'anana (IL)

(72) Inventors: Onkar Dhananjay Hingne, Pune (IN); Yuvraj Amrutrao Sawant, Pune (IN); Mohin Nadaf, Solapur (IN); Sujoy D. Datta, Pune (IN)

(73) Assignee: NICE LTD., Ra'anana (IL)

( * ) Notice: Subject to any disclaimer, the term of this patent is extended or adjusted under 35 U.S.C. 154(b) by 790 days.

(21) Appl. No.: 17/170,390

(22) Filed: Feb. 8, 2021

(65) Prior Publication Data
US 2022/0253788 A1 Aug. 11, 2022

(51) Int. Cl.
G06Q 10/06 (2023.01)
G06F 16/23 (2019.01)
G06F 16/245 (2019.01)
G06Q 10/0639 (2023.01)
H04L 67/10 (2022.01)

(52) U.S. Cl.
CPC ... G06Q 10/06398 (2013.01); G06F 16/2379 (2019.01); G06F 16/245 (2019.01); H04L 67/10 (2013.01)

(58) Field of Classification Search
None
See application file for complete search history.

(56) References Cited

U.S. PATENT DOCUMENTS

| | | | |
|---|---|---|---|
| 10,027,804 B2 | 7/2018 | Odinak et al. | |
| 10,713,626 B2 | 7/2020 | Younger et al. | |
| 11,528,362 B1* | 12/2022 | Bhat | H04M 3/5183 |
| 2012/0005113 A1* | 1/2012 | Kotis | G06Q 10/1053 |
| | | | 705/321 |
| 2014/0129466 A1* | 5/2014 | Ott | G06Q 10/06 |
| | | | 705/321 |
| 2015/0046357 A1 | 2/2015 | Danson et al. | |
| 2015/0347951 A1* | 12/2015 | Tamblyn | G06Q 30/0631 |
| | | | 705/7.39 |

(Continued)

OTHER PUBLICATIONS

*Upwork: The world's work marketplace*; © 2015-2021, Upwork® Global, Inc.; 9 pages (with full viewing at https://www.upwork.com).

(Continued)

*Primary Examiner* — Alan Torrico-Lopez
(74) *Attorney, Agent, or Firm* — Haynes and Boone, LLP

(57) ABSTRACT

A system is provided for a cloud computing environment that is adapted to perform data processing and tracking of agent data between cloud computing tenants. The system includes a processor and a computer readable medium operably coupled thereto, to perform operations which include determining a unique identifier (ID) for an agent of the cloud computing tenants, accumulating, over a time period, agent data for the agent, refining the agent data to curated data views for the agent data based on a plurality of aggregate reports for each of a plurality of KPIs in the agent data, determining a batch processing job for the refined agent data, calculating, using the batch processing job, a base asset value (BAV) score for the agent, and updating a profile for the agent associated with the unique ID based on the calculated BAV score.

20 Claims, 18 Drawing Sheets

(56) References Cited

U.S. PATENT DOCUMENTS

2016/0350165 A1* 12/2016 LeMond ............. G06F 11/0787
2017/0272550 A1* 9/2017 Rodriguez ............ H04L 41/046
2020/0019915 A1* 1/2020 Anderson ............. G06Q 30/08
2020/0034701 A1* 1/2020 Ritter ................... G06F 9/5005
2021/0344636 A1* 11/2021 Martin .................... G06F 40/30

OTHER PUBLICATIONS

*Talent Assessments: World-Class Portfolio of Assessment Content*; © 2021 SHL; 6 pages (with full viewing at https://www.shl.com/en/assessments/).

* cited by examiner

CROSS-TENANT DATA PROCESSING FOR AGENT DATA COMPARISON IN CLOUD COMPUTING ENVIRONMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a cloud computing system for analytical data processing, and more specifically to a system and method for agent data tracking and processing that may be shared between different computing tenants of the cloud computing system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

A cloud computing system may be provided for agent analytics of cloud computing tenants utilizing the cloud computing system. The cloud computing tenants may correspond to a company, organization, or other entity that requires workforce tracking and management solutions for agents of the cloud computing tenants. These agents may correspond to a workforce or employees of the cloud computing tenants, such as call center and/or digital communication channel agents that may be involved in sales, help or assistance, or the like. When hiring new agents to a particular role and/or group, supervisors, managers, and other administrators at the organization may require information to determine if the agent is the right fit for a specific role. The right fit agent may be one who helps in complementing the team by having skills that improve the performance of the team and positively impact a customer's experience with the team and/or organization. Finding an agent may involve many parties such as staffing agencies, job portals, human resource personnel, and interview panelists. Additionally, certain fields may have high attrition rates, which causes loss when agents may not be precisely matched to their role. Finding an agent may be a challenge as there is a lack of comprehensive analytical performance reports of candidates, which makes assessments of candidates dependent on interactions with the candidates during interviews. Thus, the cloud computing tenants may spend an increased amount of time and cost during recruitment.

The existing solutions do not provide a metric that brings out a candidate agent's true asset value and allows for a fair comparison with other agents. An analytical metric tracked between different cloud computing tenants for each agent may assist in comparing an agent that has worked in different companies with requirements and team members of a role for which the agent is interviewing. Furthermore, these existing solutions are company-specific, and do not translate to different companies and roles for different cloud computing tenants. The existing solutions do not provide a performance report or calculate a score of an agent for their roles across these different cloud computing tenants.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
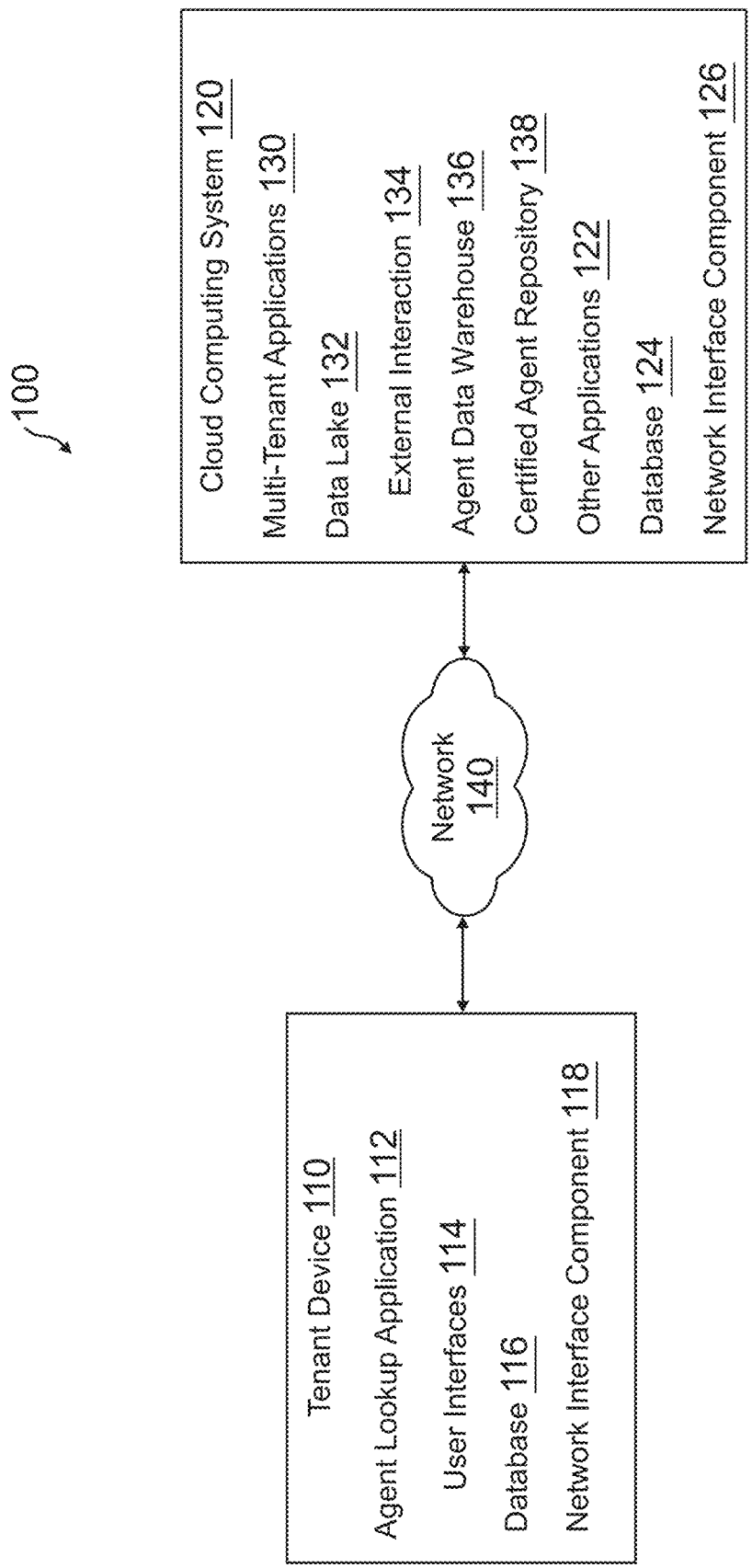
FIG. 1 is a block diagram of a networked cloud computing environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a cloud computing system, methods, data structures, and systems are provided for data tracking and processing of agent data between cloud computing tenants of the cloud computing system. A database system stores accumulated agent data over a time period, which is refined to generated, curated, and processable database views and data tables. The agent data may be generated, for example, by agents and/or administrators (e.g., managers and supervisors of an organization for the corresponding agents) using client systems or devices based on input, such as monitored data, reviews, interactions, surveys, customer satisfaction queries, and the like, when the agent performs certain actions and interactions with external clients and customers of the cloud computing tenant's organization. The agent data may further be generated and/or updated based on responses to the surveys from external sources of data, such as online questionnaires and survey results with third party systems.

The cloud computing system may provide a processing engine for agent data that allows for certified agent reporting of agents of an organization that is a cloud computing tenant. Agents may correspond to those members or employees in a workforce of the organization, including call center and/or digital channel agents that assist customers and other clients of the organization. Each agent may be associated with a globally unique, universally unique, or other unique identifier (e.g., GUID, UUID, or generally an ID) when onboarded with agent data tracking and comparison systems and operations of the cloud computing system. This unique ID allows for tracking of the agent between different cloud computing tenants, during employment or jobs with these tenants, and over time.

The cloud computing system may then track and accumulate data over a time period from different resources for a particular agent. This may include monitoring data from applications provided and utilized by one or more cloud computing tenants, or each cloud computing tenant, from the cloud computing system. For example, multi-tenant applications provided in a cloud for the cloud computing system and accessible by the cloud computing tenants may include a workforce management (WFM) application, analytic application, call recording and/or digital interaction monitoring application, automatic caller/dialer (ACD) application, as well as a tenant-specific application. These may be utilized by cloud computing tenants to provide call centers and digital channels for interactions by customers with agents of the corresponding organization. The cloud computing system may further include a data lake that interfaces between internal and external systems to receive data for interactions, surveys, and data for the agent. The data lake may gather the data from the multi-tenant applications and external interactions, which may be refined into curated data views in data tables and stored to a data warehouse. These curated data views allow for processing of the data in a standardized format.

Thereafter, at certain time intervals, batch processing jobs may be used to process the curated data views. The batch processing jobs may be used to process data tables and records for different agents at certain time periods based on key performance indicators (KPIs) within the curated data views. A KPI may correspond to a monitored statistic or analytic for an agent that indicates the agent's performance and skill, such as talk time, hold time, first call resolution, attendance, soft skill score, average handling time during a digital interaction, customer and/or agent sentiment from the interaction, and the like. Each KPI may be given a corresponding weight in a formula or operation to calculate a base asset value (BAV) score, which corresponds to a weighted score and/or metric that identifies the agent's performance and allows comparison of the agent to other agents in an objective and holistic manner. The cloud computing system may then provide different user interfaces and data processing operations to provide agent lookup and comparison to other agents and/or agent work groups by different cloud computing tenants, for example, through use of the agent's unique ID.

The embodiments described herein provide methods, computer program products, and computer database systems for BAV score determination and agent comparison through a cloud computing system. A cloud computing system provides for agent data tracking and processing of agents of one or more organizations that are cloud computing tenants utilizing the computing services provided by the cloud computing system. For example, the online system may provide a portal that is accessible by the hiring personnel, administrators, employees, human resource (HR) departments, and the like, and is used to review BAV scores and other metrics for agents. The portal may include user interface(s) to request comparisons to other agents and/or groups of agents (e.g., departments, specific workforces, agent teams, and the like). As part of providing the services to one or more cloud computing tenants, the online system may provide different user interface outputs that allows for visualizations of the agents performance over time and comparisons to other agents.

According to some embodiments, in a cloud computing system accessible by a plurality of separate and distinct organizations, an agent data tracking and processing system is provided for accumulating and refining the agent data and calculating BAV scores from KPIs in the refined agent data, thereby enhancing the experience of cloud computing tenants with agent hiring (e.g., for an internal job posting or to a new job at a different employer) through holistic and objective agent scoring and comparison cross-tenants.

Example Environment

The system and methods of the present disclosure can include, incorporate, or operate in conjunction with or in the environment of an automation engine, database, and portal, which may include cloud-based computing architecture. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include a tenant device 110 and a cloud computing system 120 for cross-tenant data processing for agent data comparisons using BAV scores based on KPIs from curated data views of agent data. In other embodiments, environment 100 may not have all of the components listed and/or may have other elements instead of, or in addition to, those listed above. In some embodiments, environment 100 is an environment in which cross-tenant data processing for agent data comparison is provided. Tenant device 110 may be any machine or system that is used by a user to display user interfaces user to request BAV scores for agents, as well as request, receive, and/or perform comparisons between different agents based on BAV scores. For example, tenant device 110 can be a handheld computing device, a mobile phone, a laptop computer, a notepad computer, a work station, and/or a network of computing devices. As illustrated in FIG. 1, tenant device 110 might interact via a network 140 with cloud computing system 120, which requests data from cloud computing system 120 and processes received data for display to cloud computing tenants.

Tenant device 110 may be utilized in order to request information regarding an agent through input of an agent's unique ID to an agent lookup application 122 via user interfaces 114 of agent lookup application 112. An agent is referred to herein as an "agent" or an "employee" of an organization, including call center and digital channel agents that assist in sales, help or assistance, service scheduling, and the like with customers and clients, but may more broadly correspond to any type of member of a workforce. The agent's unique ID may be provided by hiring personnel, supervisors, administrators, and the like of an organization that is a cloud computing tenant of cloud computing system 120. Thus, tenant device 110 may correspond to a device, server, or the like that interfaces with cloud computing system 120 to utilize the cloud services, applications, data storage, and the like of the corresponding cloud computing environment. Cloud computing system 120 may receive the unique ID for the agent and perform database lookups and data retrieval based on tracked and processed agent data, as discuss herein. Thereafter, agent lookup application 112 may display the results associated with the agent's unique ID within user interfaces 114, which may include a BAV score for the agent, as well as individual KPI scores when requested. Additionally, agent lookup application 112 may further be used to request comparisons of an agent to other agents via user interfaces 114, including other potential hires for agents, agents within a team or group (e.g., sales within an organization and/or cross-tenant groups), and the like.

Cloud computing system 120 may be utilized by different cloud computing tenants to perform cross-tenant agent data tracking and processing in order to objectively and holistically compare agents using BAV scores and/or KPIs. Cloud computing system 120 may accumulate and refine agent data tracked and collected through multi-tenant applications 130 and a data lake 132. Multi-tenant applications 130 may include tenant applications, WFM applications, user applications, ACD applications, call recording applications, analytic applications, and the like that may provide cloud services, cloud data processing, and cloud storage to cloud computing tenants (e.g., an organization associated with tenant device 110). Data lake 132 may include data accumulated from multi-tenant applications 130, as well as external interactions 134 resulting from interactions by agents with customers and clients that may be external to cloud computing system 120. External interactions 134 may include monitored interactions of an agent via external resources and applications, such as received feedback data including customer satisfaction surveys, telephone or digital channel usages, and the like. Data lake 132 may therefore accumulate the data for processing over a time period.

Once data for one or more agents is accumulated over a time period, the agent data may be refined to standardize and format the data into curated data views and data tables. These curated data views may correspond to data used to determine a KPI value or score for each individual KPI that factors into a BAV score. Refined data may be stored to an agent data warehouse 136, which may correspond to a cloud-based big data warehouse where refined agent data in curated data views may be stored prior to and/or after processing in a batch processing job when determining BAV scores. At the end of the time period of accumulating and refining agent data, a batch processing job may be used to determine KPIs relevant to BAV score calculation, and therefore calculate a BAV score using a weighted formula or technique for each KPI in a BAV score calculation. BAV scores for each time period are then associated with the unique IDs for agents of the cloud computing tenants, which allow for an average BAV score to be determined for agents over time, at specific points in time, and/or weighted based on changes over time (e.g., by favoring or more highly accounting for more recent BAV scores of agents).

Thereafter, cloud computing system may provide BAV scores and KPIs from certified agent repository 138 to tenant device 110 for output through one or more of user interfaces 114. The BAV scores and other data may include a most score and/or data, as well as changes in the scores and other data over time including heatmaps that may designate certain agent skills and changes over time. Cloud computing system 120 may further perform comparisons of one or more agents to one or more other agents based on the BAV scores, KPIs, and other data. For example, an agent that is an interview candidate for a job may be compared to agents for the team for which the agent may be hired. This candidate agent may be compared through one or more user interfaces that display a BAV scores for the candidate with the BAV scores for one or more agents currently at the organization (e.g., a cloud computing tenant of cloud computing system 120). The one or more agents compared to the candidate agent may include a prospective team hiring that candidate agent. An exemplary user interface having this comparison of BAV scores is shown further in FIG. 2F. These comparisons may include over time comparisons based on changes to scores and other data for each agent, and may further include information showing an agent skill distribution and details of KPIs for the interview candidate.

The users of tenant device 110 and/or cloud computing system 120 may differ in their respective capacities, and the capacity of cloud computing tenants using tenant device 110 and/or cloud computing system 120. These capacities might be entirely determined by applications, permissions, and profiles for a current user. For example, where an agent is using a device to interact with cloud computing system 120 and view BAV scores, that user system has the capacities allotted to that agent and those computing events may be associated with an agent. However, where an administrator or manager involved in hiring an agent is using tenant device 110 to lookup agent BAV scores and perform agent comparisons, that tenant device 110 has the capacities allotted to that administrator and may perform actions associated with that administrator. Thus, different users may have different capabilities, different permissions, and perform different events, with regard to agent data tracking and processing that may be provided by cloud computing system 120. Both tenant device 110 and cloud computing system 120 may execute a web-based client that accesses a web-based application for cloud computing system 120, or may utilize a rich client, such as a dedicated resident application, to access cloud computing system 120.

Tenant device 110 may also typically utilize one or more user interface devices, such as a keyboard, mouse, trackball, touch pad, touch screen, pen or the like, for interacting with a graphical user interface (GUI) (e.g., one or more of user interfaces 114) provided by an application or browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the cloud computing system 120 or other systems or servers through the web-based or rich client. For example, the user interface device can be used to access data and applications hosted by cloud computing system 120, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Tenant device 110 might communicate via a network interface component 118 with cloud computing system 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Similarly, cloud computing system 120 may communicate with one or more cloud computing tenants, including tenant device 110, via a network interface component 126 using the same or similar Internet protocols. In an example where HTTP/HTTPS is used, tenant device 110 might include an HTTP/HTTPS client commonly referred to as a "browser" for sending and receiving HTTP//HTTPS messages to and from an HTTP//HTTPS server, such as cloud computing system 120. Such an HTTP/HTTPS server might be implemented as the sole network interface between tenant device 110 and/or cloud computing system 120, but other techniques might be used as well or instead. In some implementations, the interface between tenant device 110 and cloud computing system 120 includes load sharing functionality.

Tenant device 110 and/or cloud computing system 120 may utilize network 140 to communicate with cloud computing system 120 and/or each other, which is any network or combination of networks of devices that communicate with one another. For example, network 140 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, cloud computing system 120 is configured to provide webpages, forms, applications, data, and media content to tenant device 110 and/or to receive data from tenant device 110, including unique IDs for agents and requests for agent lookup and comparison. As such, cloud computing system 120 provides security mechanisms to keep data secure. Additionally, the term "system" is meant to include a computer system and/or server(s), including processing hardware and process space(s), and an associated storage system and database application (e.g., object-oriented data base management system (OODBMS) or relational database management system (RDBMS)). It should also be understood that "server system" and "system" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, agent lookup application 112 of tenant device 110, shown in FIG. 1, may correspond to the applications and API services that provide user interfaces 114 (web browser, desktop application, etc.) for a cloud computing tenant (e.g., an organization and/or member of the organization, such as an employee, staff, officer, HR and/or hiring department, and the like for a company) to interact with cloud computing system 120. Cloud computing system 120 may execute multi-tenant applications 130 to interact with agent lookup application 112. For example, in one embodiment, cloud computing system 120 includes application servers configured to implement and execute software applications as well as provide related data, code, forms, webpages, and other information associated with multi-tenant applications 130, and to store to, and retrieve from, a database system related data, objects, and web page content associated with multi-tenant applications 130. For example, cloud computing system 120 may implement various functions of multi-tenant applications 130, and the processing space for executing system processes, such as running applications as part of multi-tenant applications 130. Additional processes that may execute on cloud computing system 120 include database indexing processes associated with survey questions and scheduling parameters received from tenant device 110 and survey responses received from cloud computing system 120.

Several elements in the system shown in FIG. 1 include elements that are explained briefly here. For example, tenant device 110 could include a desktop personal computer, workstation, laptop, notepad computer, PDA, cell phone, or any wireless access protocol (WAP) enabled device or any other computing device capable of interfacing directly or indirectly to the Internet or other network connection. Tenant device 110 typically runs an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, or the like. According to one embodiment, each of tenant device 110 and/or cloud computing system 120 and all of its components are configurable using applications including computer code run using one or more central processing unit such as an Intel Pentium® processor or the like. Similarly, cloud computing system 120 and all of their components might be operator configurable using application(s) including computer code to run using a central processing unit, which may include an Intel Pentium® processor or the like, and/or multiple processor units. In this regard, cloud computing system 120 may be performed by a greater number of devices and/or servers to form a cloud-based environment to provide online services to cloud computing tenants through cloud computing and cloud-based service delivery. This cloud computing environment therefore may provide and/or improve data processing, storage, and retrieval through networked servers and devices forming the cloud computing environment. A computer program product embodiment includes a machine-readable storage medium (or media) having instructions stored thereon/in which can be used to program a computer to perform any of the processes of the embodiments described herein utilizing one or more computing devices.

Computer code for operating and configuring tenant device 110 and/or cloud computing system 120 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 of tenant device 110 and/or data lake 132, agent data warehouse 136, certified agent repository 138, and/or database 124 of cloud computing system 120, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. For example, database 116 and/or database 124 may store application and system data associated with providing and administering agent lookup application 112 and/or multi-tenant applications 130, respectively. Additional data may further be stored by data lake 132, agent data warehouse 136, and certified agent repository 138, including accumulated agent data, refined agent data in curated views, determined KPIs, and calculated BAV scores, which may be timestamped and/or correlated to unique IDs of agents. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Cloud Computing Environment

Figure 2A:
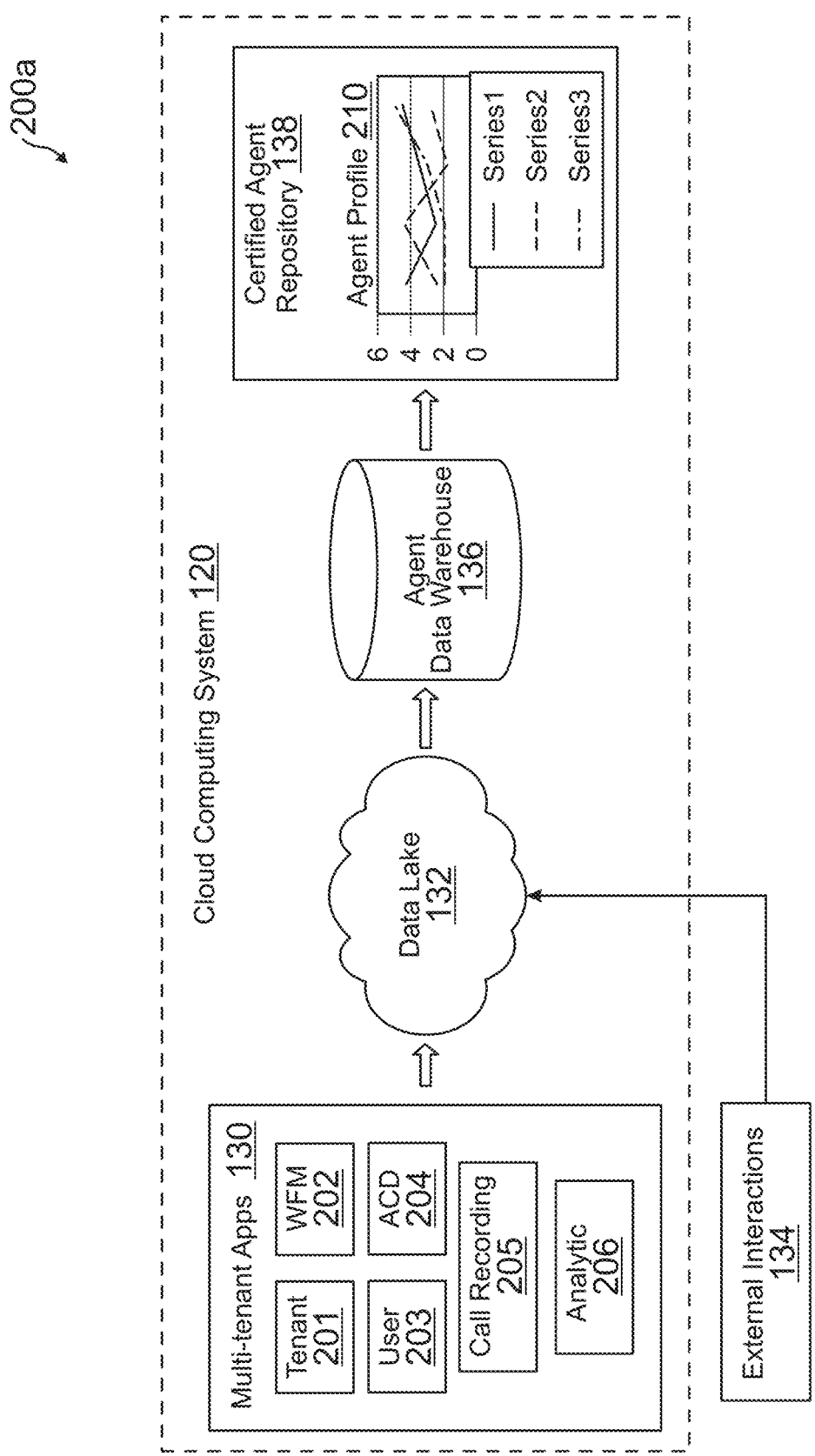
FIG. 2A is a block diagram of an agent data tracking and processing system in a cloud computing environment for cross-tenant comparison of agent data according to an embodiment.

FIG. 2A is a block diagram of an agent data tracking and processing system in a cloud computing environment for cross-tenant comparison of agent data according to an embodiment. Environment 200a of FIG. 2A includes cloud computing system 120 having multi-tenant applications 130, data lake 132 further interacting with multi-tenant applications 130 and external interactions 134, agent data warehouse 136, and certified agent repository 138, discussed in reference to environment 100 of FIG. 1. In this regard, environment 200a displays the accumulation, transfer, refinement, and processing of agent data over a network when generating BAV scores for one or more agents associated with cloud computing tenants of cloud computing system 120 (e.g., work agents of an organization).

In environment 200a, to provide cross-tenant data tracking, for example, to allow for agent comparison, a cloud computing environment may be provided that generates a BAV score for an agent across different cloud computing tenants, which can be used as a holistic and/or objective analytic for individual agents (e.g., during hiring decisions). BAV scores may also be provided in reports having comparison with members of a particular team, division, specialty, or employment title/roll. Cloud computing system 120 may provide one or more platforms accessible via user interfaces that include comprehensive reports having analytical insights on KPIs for an agent over a period of time. These KPIs may be combined and weighted in a calculation of a BAV score, which shows key strengths and weaknesses of the corresponding agent and identifies trends in the agent's performance over time. This report may further provide the experience and proficiency of the agent for particular skills identified by the KPIs and overall BAV score. Each agent may be associated with a unique ID, such as a GUID, UUID, or the like, that uniquely identifies the agent across the cloud computing tenants of cloud computing system 120. Thereafter, KPIs for the agent are collected and linked to this unique ID, and a BAV is calculated using the collected KPIs. This allows for tracking of the agent as the agent moves between new jobs and/or organizations corresponding to the cloud computing tenants.

As shown in FIG. 2A, cloud computing system 120 may provide a multi-tenant cloud-based contact center that includes microservices to provide data tracking for agent comparison across different tenants. Data from different cloud-based multi-tenant applications 130 belonging to different tenants may be streamed to data lake 132. This may include tenant applications 201, WFM applications 202, user applications 203, ACD applications 204, call recording applications 205, and/or analytic applications 206. However, different embodiments of cloud computing system 120 may provide more, less, or different cloud-based applications and services to cloud computing tenants. Multi-tenant applications 130 may therefore generate data for KPIs that are used to calculate a BAV score. For example, WFM applications 202, call recording applications 205, and/or analytic applications 206 may be used to determine a talk time, handle time, and/or hold time for call center and/or digital channel agents. Other applications may provide other agent data, such as analytics, surveys, and the like, all of which can be used for different KPIs.

Data lake 132 shown in FIG. 1 may include certain components and features for accumulating, collecting, and aggregating data over a period of time. For example, data may arrive from microservices over one or more data streams to data lake 132. The data streams may include those with multi-tenant applications 130 and/or external interactions 134. In this regard, external interactions may provide data from external sources, such as surveys on customer satisfaction, issue resolution, and the like. Other external data from external interactions 134 may include those associated with agent or customer sentiment, agent attendance, call or digital channel interaction parameters and analytics, and the like that may be solicited and/or received from customers and/or third parties. The data may be stored and processed in data lake 132 using big data processing techniques. Once the data is available in data lake 132, the data may be provided and collected in a staging area. Data in the staging area may then be converted to compressed files, and once available, the data may then be processed and converted into refined views suitable for reporting. These refined views allow for standardized data views and tables that allow for identification of data for particular KPIs and determination of those KPIs for individual agents. The refined data is also stored by and loaded to data tables, such as in agent data warehouse 136 shown in FIG. 2A. Agent data warehouse 136 may then store these data tables over a time period, after which the data tables may be processed is a batch processing job.

At certain intervals, such as the expiration of a time period (e.g., month, bi-monthly, etc.), a batch processing job is then generated and executed to process the curated data views in the data tables stored by agent data warehouse 136. This includes determining KPIs associated with each agent and using those KPIs to calculate a BAV score for that time period. The BAV score may then be averaged and/or weighted with other BAV scores for the agent (e.g., previous scores calculated during previous time periods, or from any application(s), or both). Determination of the KPIs and BAV score for an agent is discussed in more detail with regard to FIGS. 3 and 4. Certified agent repository 138 may store the KPIs and/or BAV scores for an agent, including over time analytics and performances, in an agent profile 210, which may be associated with the agent's unique ID. This allows for reporting of data to cloud computing tenants and multi-tenant access of an agent's BAV scores, KPIs, analytics, and/or other data.

When reporting the data, such as through certified agent repository 138, a reporting architecture may provide a reporting tool for creating analytical reports. The reporting architecture may include one or more user interfaces provided through an application or web portal (e.g., via an accessible website hosted by cloud computing system 120). The reporting architecture may allow for input of an agent's unique ID, which allows database calls and data retrieval from certified agent repository 138. Further, the reporting architecture may provide one or more display outputs to display the agent's BAV score, as well as strengths and weaknesses as skills designated by KPIs. This display output may include heatmaps identifying those particular skill values and attributes of an agent, or other selected skills or attributes. The reporting architecture may further allow for designation of other agents for agent comparison, where visualizations and heatmaps may be used to compare BAV scores and corresponding KPI skill assessments. Data may then be processed and streamed by microservices and applications of certified agent repository 138 to cloud computing tenants during agent comparison. This data may further include additional information, such as interaction metadata, call analytics and metadata, sentiment analysis, agent information, and the like. Further, an authentication service may provide sign-on services and authentication for tenants and agents when performing data reporting and comparisons of agents.

Figure 3A:
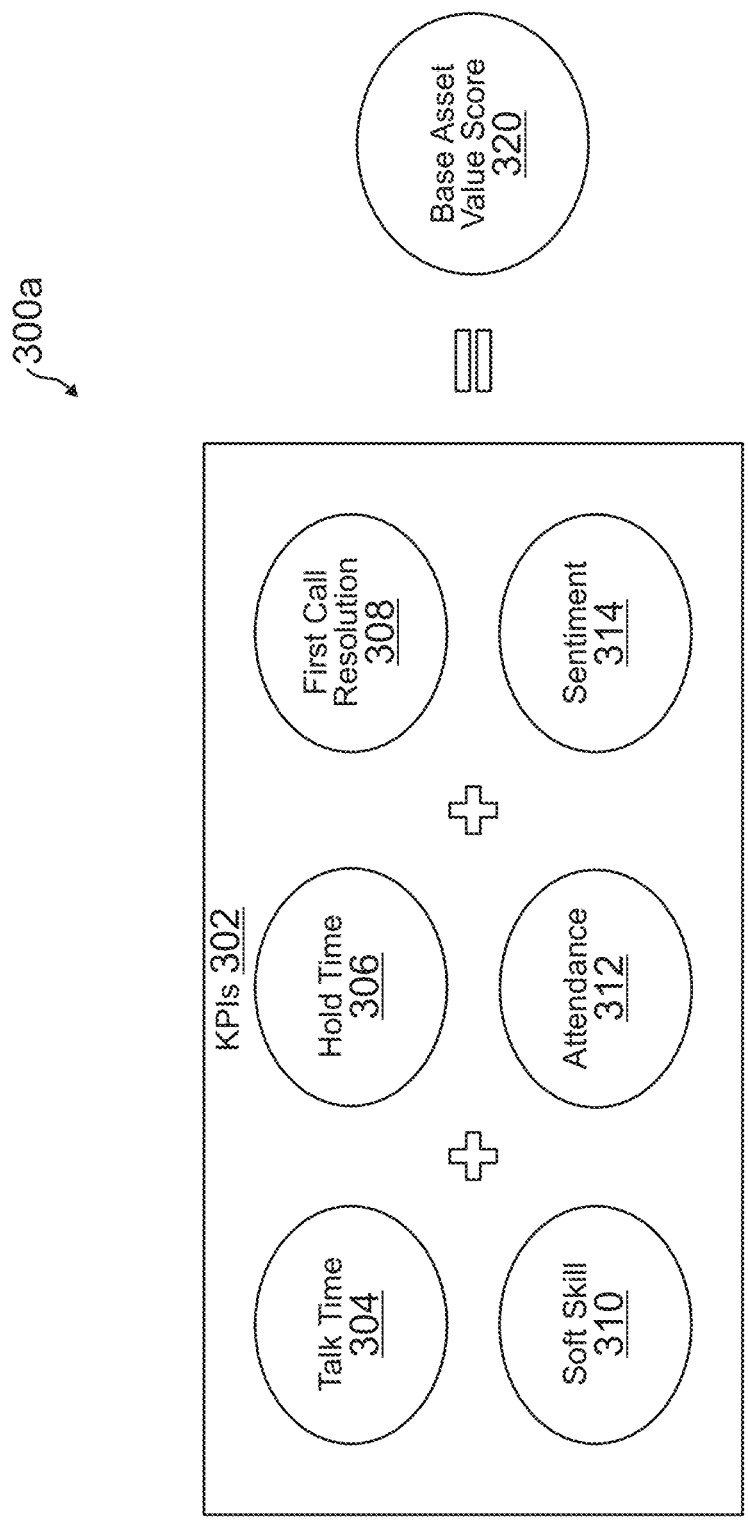
FIG. 3A is a simplified diagram of key performance indicators for agents that may be tracked, accumulated, and processed for a base asset value calculation in a cloud computing environment according to some embodiments.

In order to implement the architecture of FIG. 2A, an account number may be used to track agent data. Agents may move across companies and other cloud computing tenants, so a unique ID for each agent may be utilized to allow for performance information to be tracked, aggregated, and processed across the cloud computing tenants. Thus, a candidate agent for a role or position may provide this account number or other indicator, which may be used by a hiring manager to generate a performance report of the agent. As shown in FIG. 3A, when a performance report is generated, cloud computing system 120 of FIG. 2A may calculate a score for each KPI for the agent by linking the agent's performance across companies through their unique ID. The analytics engine of FIG. 2A may generate a BAV score for each agent periodically that is used in generating the report.

For example, each agent may have an account number as a unique ID that is generated for each agent in the system of FIG. 2A. This account number may assist in binding together the data of the agent across employment with different tenants' organizations. In some embodiments, the account number may be a unique ID by utilizing a prefix (e.g., two first letters, such as CX)+a date of agent or user creation+an 8-digit random number. For example, if an agent was onboarded and an account created on Nov. 1, 2019 then the unique ID for the agent may be CX2019110138725615. This account number is generated when records of the agent are created with cloud computing system 120 and may be generated on a one-time basis so that the agent is tracked between cloud computing tenants. The unique ID may be bound to some information for the agent, such as a social security number, name, phone number, email address, biometric (e.g., fingerprint), personally identifiable information, or the like. Thus, the unique ID may follow the agent unique between employment without being lost.

Figure 2B:
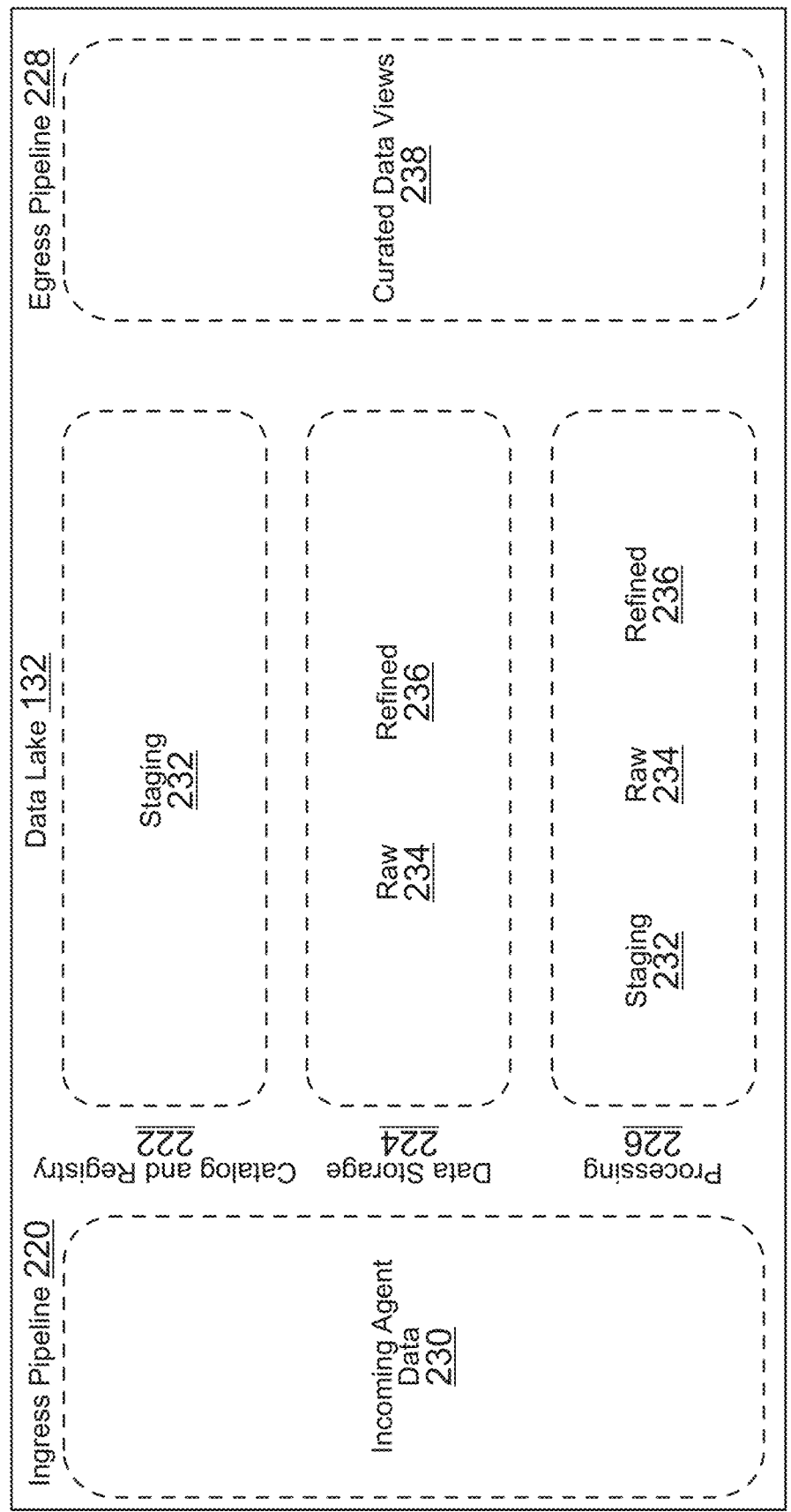
FIG. 2B is a block diagram of a data lake for cross-tenant agent data tracking in a cloud computing environment according to some embodiments.

FIG. 2B is a block diagram of a data lake for cross-tenant agent data tracking in a cloud computing environment according to some embodiments. Environment 200b of FIG. 2B includes data lake 132 discussed in reference to environments 100 and 200a of FIGS. 1 and 2A. In this regard, environment 200b displays the accumulation, transfer, and refinement of agent data prior to storage in agent data warehouse 136 of environments 100 and 200a, which may then be processed in batch processing jobs for BAV score calculation.

In this regard, data lake 132 includes an ingress pipeline 220 connected to one or more applications and/or data sources (e.g., multi-tenant applications 130 and/or external interactions 134). Raw agent data from applications and sources may arrive as master data in the form of incoming agent data 230. This may arrive over one or more data streams, where the data may then be transferred and/or loaded to a staging area as JavaScript Object Notation (JSON) files, where the staging area may be built on a platform corresponding to Amazon Web Services (AWS) Simple Storage Service (S3) or the like. In this regard, catalog and registry 222 may perform the collecting and tracking of incoming agent data 230 as incoming agent data 230 arrives from data streams and create batches of data as per cumulative size of the files. Catalog and registry may therefore handle staging data 232 available for processing 226. Data storage 224 may perform storing of raw data 234, accumulated data, and/or refined data 236 for data lake 132, which may then be further processed using processing 226 and/or output via an egress pipeline 228 during one or more processing jobs and/or data transfers to another data storage, such as agent data warehouse 136.

Figure 2C:
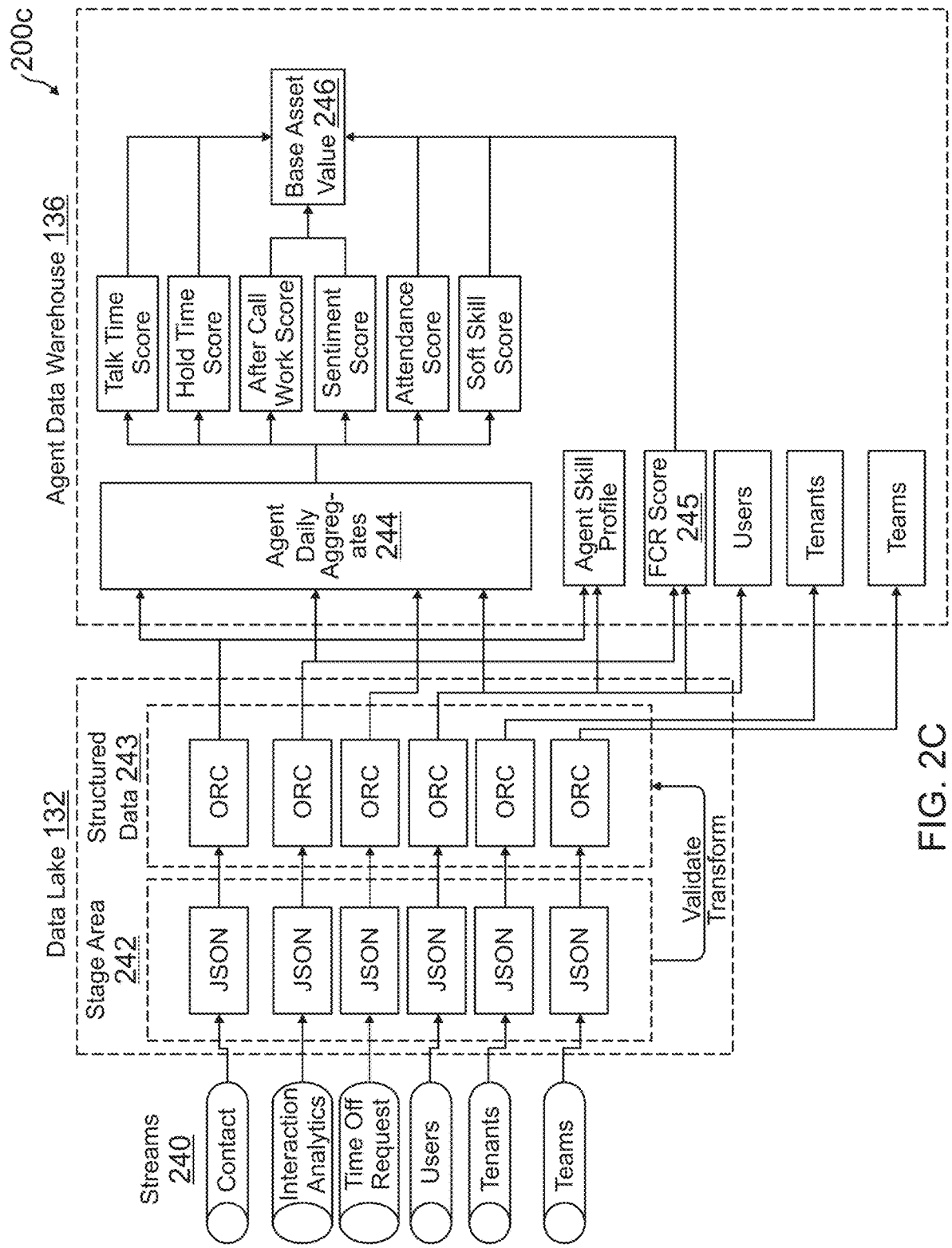
FIG. 2C is a block diagram of data flow when processing key performance indicators to convert raw data for the key performance indicators to percentile-based scores for a base asset value calculation according to some embodiments.

Thereafter, batched data from incoming agent data 230 may be converted to a compressed file, for example, in a compression format including Optimized Row Columnar (ORC) file format, or another suitable format. For example, processing 226 may convert staging data 232 to raw data 234 in a raw data area of data storage 224. The batched data may be processed using processing jobs on processing clusters which convert the JSON files into the compressed files and segregates data by tenant and daily (or other time period) partitions. The processing jobs may also sanitize incoming agent data 230 so that invalid records may be removed and sent for correction. These processing jobs therefore convert raw data for KPIs in incoming agent data 230 to percentile-based scores that allow for a comparative ranking of an agent within the agent's peer group, as shown in FIG. 2C. Further, during sanitization of data, unnecessary data and identifying data for an agent, customer interaction, communication, employment information, and/or organization (e.g., cloud computing tenant) may be removed so that the data may be analyzed by other cloud computing tenants without compromising security and/or privacy of agents and/or organizations.

FIG. 2C is a block diagram of data flow when processing key performance indicators to convert raw data for the key performance indicators to percentile-based scores for a base asset value calculation according to some embodiments. Environment 200c of FIG. 2C includes data lake 132 and agent data warehouse discussed in reference to environments 100 and 200a of FIGS. 1 and 2A. In this regard, environment 200c displays streaming of agent data to data lake 132, which then processes the data prior to storage in agent data warehouse 136. This then allows for calculation of a BAV score for one or more agents.

In environment 200c, streams 240 are shown as streaming raw data for KPIs into data lake 132 for processing. Streams may include those data streams from cloud-based applications and the like, where raw agent data may be generated from such applications. Thereafter, streams 240 may provide raw agent data to a stage area 242 within data lake 132, which may include the raw data in one or more containers or files, such as JSON files within stage area 242. Within data lake 132, one or more processing jobs may be used to validate, transform, and/or compress the JSON files to ORC files in structured data 243 of data lake 132.

ORC files from structured data 243 may then be processed to determine agent daily aggregates 244 within agent data warehouse 136. For example, a daily processing job may determine daily aggregates and averages for each KPI based on the ORC files in structured data 243. KPIs for agent daily aggregates 244 may be based on a talk time score, hold time score, after call work score, sentiment score, attendance score, and/or soft skill score. Additionally, a first call resolution (FCR) score 245 in agent data warehouse 136 may be determined at certain time intervals, which may be longer than the daily average KPI score calculation, to account for later received data that indicates resolution of a customer issue during the first call with the agent. Thereafter, during a monthly processing job for BAV score calculation, agent daily aggregates 244 and FCR score 245 may be used to determine a BAV 246 for one or more agents, as shown further in FIGS. 2D and 3A-G. When converting the raw data to the percentile-based scores for KPIs, the data may be scrubbed of proprietary and/or identifying data so that agents may be compared without exposing underlying sensitive data.

Returning to FIG. 2B, once raw data 234 is available, raw data 234 may be processed using one or more refiners and converted to refined data 236, which may then be converted to curated data views 238 suitable for reporting and use in BAV score determination. Refined data 236 and/or curated data views 238 may be stored to one or more data tables and loaded to data storage 224 and/or agent data warehouse 136. Thus, at the end of processing 226, incoming agent data 230 may be converted to structured files in a format suitable for big data handling and analysis in agent data warehouse 136. When refined data 236 is processed and aggregated to form one or more of curated data views 238 for each agent, the processing and aggregating may occur on a daily or other time unit basis (e.g., hour, weekly, monthly, etc.). This may include accumulating data for individual KPIs of an agent on a daily basis, or on a work-shift basis if the agent works two or more periods in a day. The curated data view(s) contains the daily aggregated average values for the KPI metrics that may be used in the computation of different scores and the BAV score. Using curated data views 238, a monthly processing job may be executed to determine the BAV score, as shown in FIG. 2D.

Figure 2D:
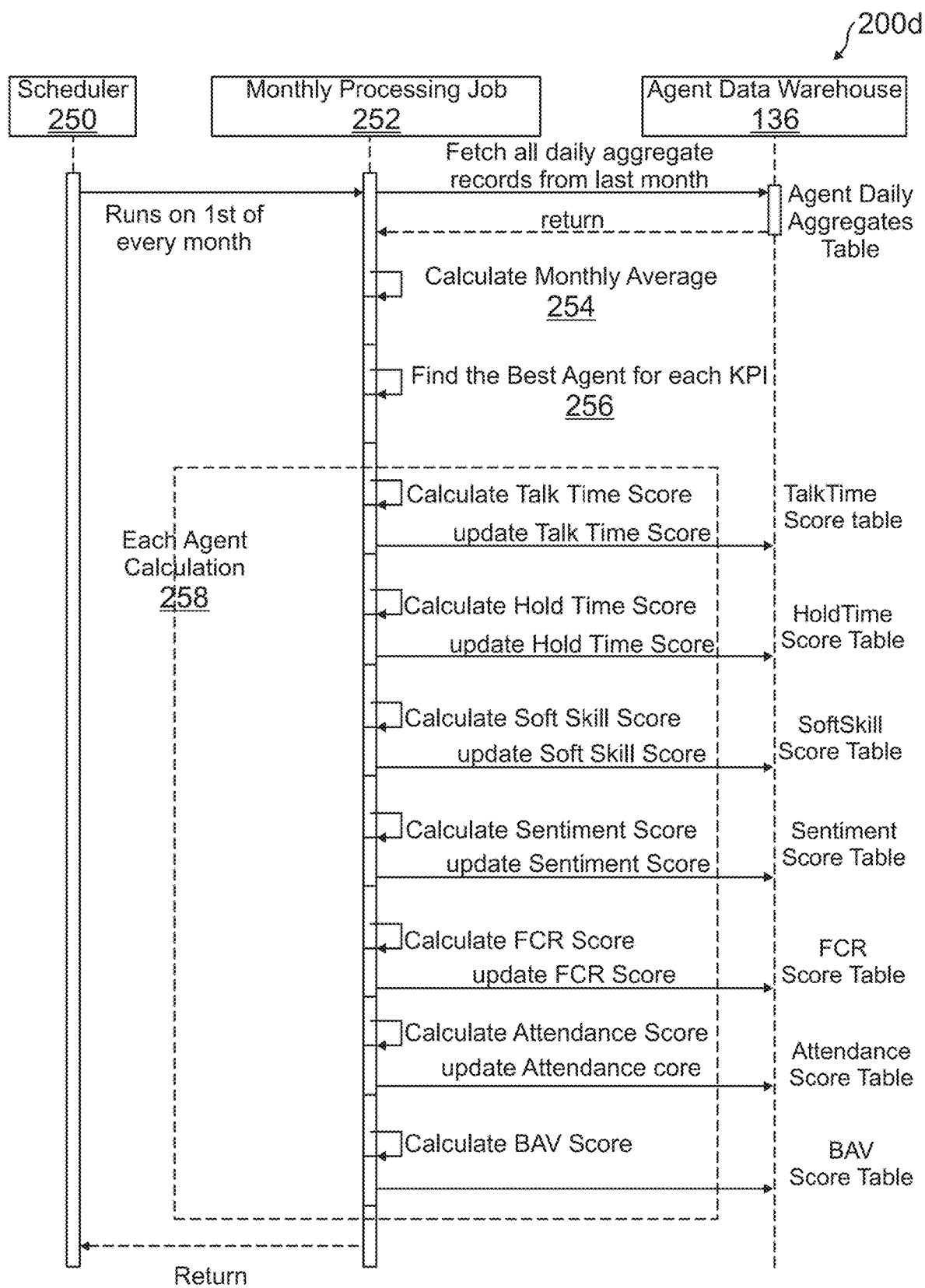
FIG. 2D is a simplified diagram of a flowchart for a monthly processing job for converting daily average key performance indicators into a base asset value according to some embodiments.

FIG. 2D is a simplified diagram of a flowchart for a monthly processing job for converting daily average key performance indicators into a base asset value according to some embodiments. In some embodiments, generating BAV scores described in flowchart 200d of FIG. 2D can be implemented and performed using cloud computing system 120. In this regard, in flowchart 200d a scheduler 250 may perform and/or execute a monthly processing job 252 in agent data warehouse 136 based on curated data views 238 stored in agent data warehouse 136.

For example, scheduler 250 may execute at the first of each month or at another time interval to perform monthly processing job 252. Monthly processing job 252 may then fetch one or more data tables for KPIs that include the daily aggregated agent data from agent data warehouse 136. For each agent, a monthly average 254 is calculated for each relevant KPI. Thereafter, a best agent 256 is determined for each KPI, which corresponds to the agent that has a highest or best KPI score for the relevant KPI. Best agent 256 and a corresponding KPI score for that KPI is then held in a memory or storage so that best agent 256 may be compared to other agents. This allows for calculation of percentile-based KPI scores. Using best agent 256, each agent calculation 258 is performed where each agent's individual KPI score is compared to the KPI score for best agent 256 for that particular KPI. Each percentile-based KPI score for an agent is stored to agent data warehouse 136. Using each percentile-based KPI score for the relevant KPIs of the agent are then used in a BAV score calculation, as shown further in FIG. 3A.

Figure 2E:
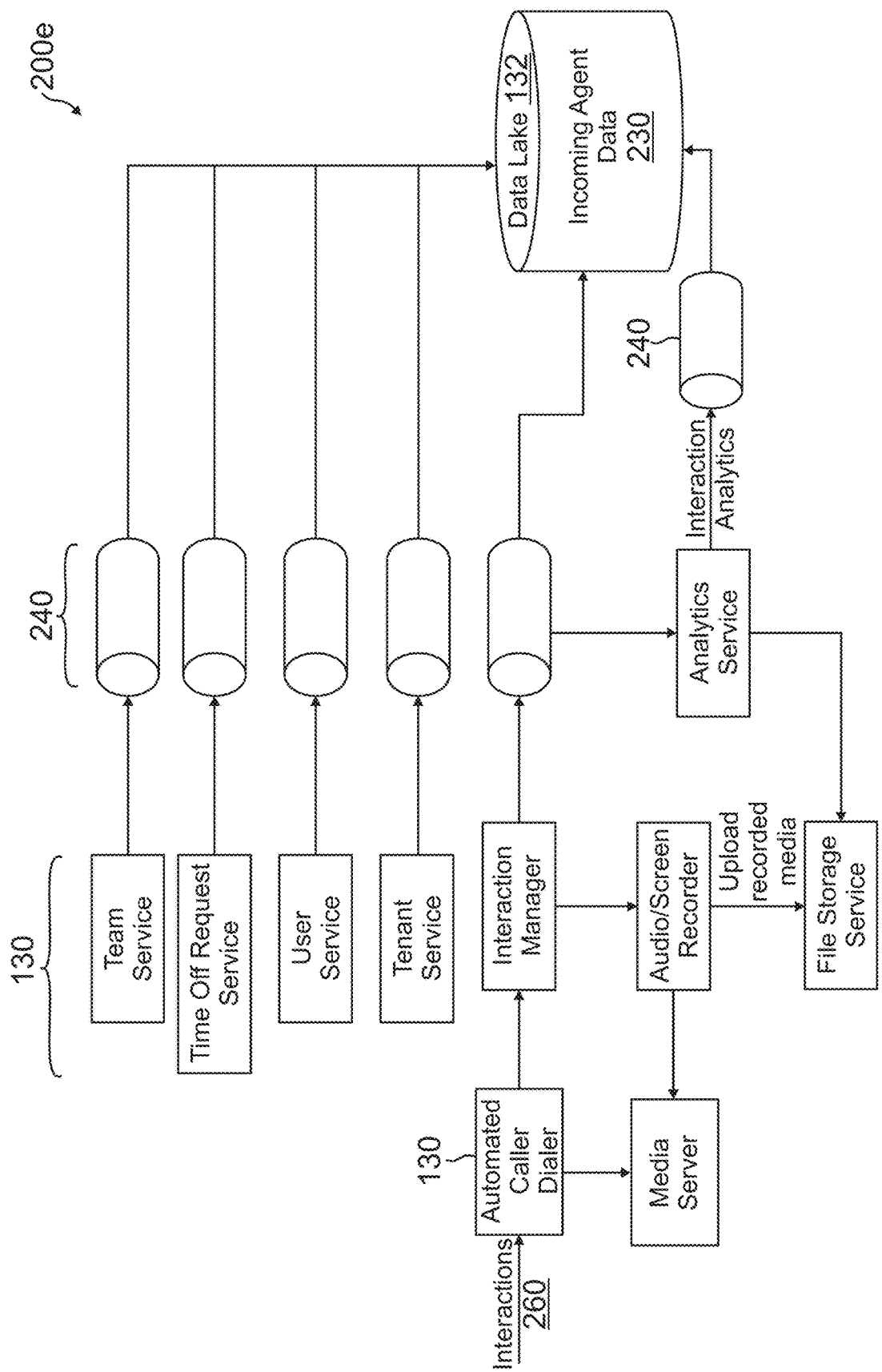
FIG. 2E is a block diagram of data flow from streams into a data lake used to store information for key performance indicator calculations according to some embodiments.

FIG. 2E is a block diagram of data flow from streams into a data lake used to store information for key performance indicator calculations according to some embodiments. Environment 200e of FIG. 2E includes data lake 132 discussed in reference to environments 100 and 200a of FIGS. 1 and 2A. In this regard, environment 200e displays streaming of agent data to data lake 132, which then processes the data prior to storage in agent data warehouse 136.

In FIG. 2B, ingress pipeline 220 may receive incoming agent data 230 from one or more data streams and/or data ingress pipelines. FIG. 2E displays the ingress of raw data to data lake 132 in further detail. For example, in environment 200e of FIG. 2E interactions 260 and additional data from multi-tenant applications 130 may be streamed to data lake 132 as raw data that may be processed to determine BAV scores, as discussed herein. Multi-tenant application 130 may include multiple different applications and services that provide raw data that is processed to determine percentile-based KPIs, which are then used in BAV score calculation. In this regard, multi-tenant applications 130 may include a user service that may provide application programming interfaces (APIs) for create, read, update, and delete (CRUD) operations on user data as it is pushed to data lake 132 from user services. Similarly, a team service and a tenant service may similarly provide APIs for CRUD operations for team data from team services and tenant data from tenant services, respectively, as that data is pushed to data lake 132. A time off request service may manage leave and time off requests, approvals, and missing days. This may also manage cancelling of requests where the request may be canceled or declined. Data from each of these services of multi-tenant applications 130 may stream data to data lake 132 through one or more of streams 240, which may correspond to Amazon Kinesis™ streams.

Multi-tenant application 130 and/or other data services may also stream data to data lake 132. For example, an automated caller dialer (ACD) and/or other contact entities and services may manage and report incoming agent data 230 to ingress pipeline 220. These may include interactions 260 by customers with agents, including phone calls through call centers and telephonic interactions, as well as chat, email, social networking, and the like through digital communication channels. In this regard, when a customer calls a contact center, the call may be handled by an ACD service and the ACD service may inform an interaction manager (IM) about the new call using computer telephony events. The IM may instruct the recorders to start recording the call. Once the call is fully recorded, the call may be uploaded to a file storage with detailed metadata of the call that represents the details of the call including start time, end time, channel, direction (e.g., incoming or outgoing), agent, customer information, recording data, and the like, which is saved to data lake 132. An interaction analytic service may then analyze additional information from the call. For example, when the IM sends call data for the call via a data stream to an analytic service, the analytic service may use the metadata to retrieve the recorded call media file. The analytic service may run a speech to text algorithm to create a call transcript.

Thereafter, textual analytics may be run on the transcript to generate the data of agent and/or customer sentiments, call category, first call resolution, and the like for corresponding KPIs. Textual analytics may also be used with digital communications through digital channels. The call and/or digital communication, metadata, and/or analytics of the corresponding transcript may be further used to determine a talk time, hold time, handle time, and the like. As previously discussed, the data may also be cleaned so that raw data is not exposed. Cleaning may include removing identifying characteristics and/or raw numbers, analytics, or data for an agent, customer, and/or organization during KPI averaging and BAV score determination, thereby preventing exposure of proprietary data for cloud computing tenants. This may also assist in protecting agent, customer, and organization privacy and prevent identifications of those entities by other cloud computing tenants (e.g., when KPIs and/or BAV scores are shared between different cloud computing tenants for agent review and comparison).

Returning to FIGS. 2A and 2B, curated data views 238 may be output via egress pipeline 228 during one or more processing jobs and/or data transfers to another data storage, such as agent data warehouse 136. Thereafter, agent data warehouse 136 may process curated data views 238 in a monthly processing job to generate a BAV score for an agent, for example, using the flowchart of FIG. 2D. Generating the KPIs and BAV scores may also include calculating a new or updated KPI and/or BAV score from an existing KPI and/or BAV score. For example, where the agent has previously been onboarded and tracked over time from previous work with one or more of the cloud computing tenants for cloud computing system 120, a new weighted KPI and/or BAV score may be calculated using the past values and the newly calculated values from the monthly processing job. Thereafter, the monthly averaged KPIs and/or BAV scores may be accessed and compared through one or more user interfaces and the data provided by certified agent repository 138. An exemplary user interface used for agent comparison is shown further in FIG. 2F.

Figure 2F:
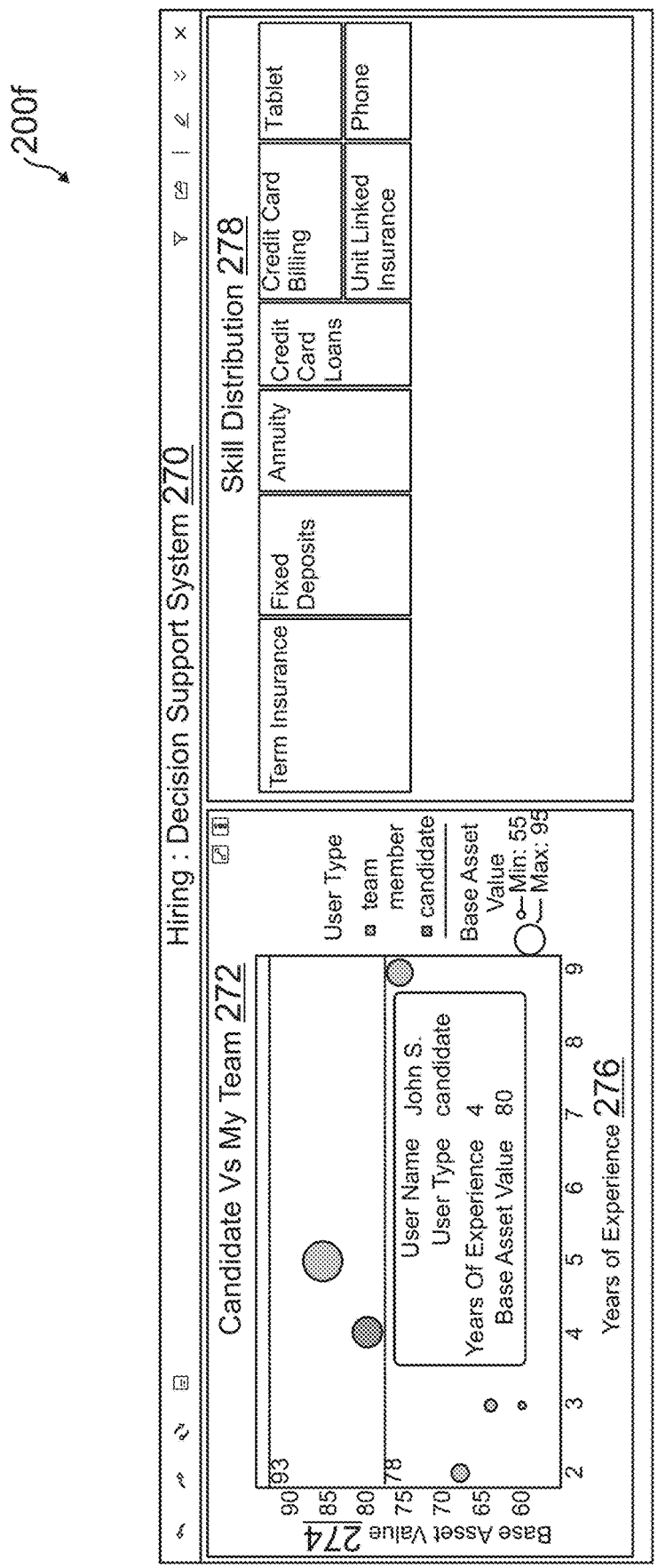
FIG. 2F is an exemplary user interface that shows a comparison of an agent to members of a team based on base asset values according to some embodiments.

FIG. 2F is an exemplary user interface that shows a comparison of an agent to members of a team based on base asset values according to some embodiments. Interface 200f of FIG. 2F may be displayed by a computing device when comparing agents based on BAV scores and other analytics, such as when comparing an interview or employment candidate with similar agents including those agents that may currently be employed by the organization (e.g., agents in a team performing the potential hiring of the candidate agent). Thus, interface 200f may be displayed by tenant device 110 when comparing agents.

Interface 200f displays a decision support system 270 during a hiring comparison of a prospective candidate agent to one or more agents within a team. Decision support system 270 in interface 200f allows for designation of a candidate agent, such as through their unique ID assigned to the agent. This allows for retrieval of a BAV score and other data, including averaged KPIs and/or other skill information. The other agents may be designated as a team or other agents within an employment field for the same or similar to the job for which the candidate agent is interviewing. In this regard, decision support system 270 displays a comparison graph 270 that displays a candidate versus my team comparison of BAV scores 274 for the candidate agent and those agents in the team. The comparison may include an average BAV score for the agents, shown as 78 in FIG. 2F. Further, comparison graph 270 further shows a years of experience value 276 to further see comparisons between agents and additional relevant data. Decision support system 270 may also include a skill distribution 278 that allows for viewing of skills and distribution of skills for the candidate agent and/or the agents within the team performing the hiring.

FIG. 3A is a simplified diagram of key performance indicators for agents that may be tracked, accumulated, and processed for a base asset value calculation in a cloud computing environment according to some embodiments. Environment 300a of FIG. 3A displays KPIs 302 used in the determination of a BAV score 320 for an agent. Data for KPIs 302 may be collected and aggregated as daily (or other amount of time) values based on per agent daily interactions. These values for KPIs 302 may then be accumulated over a time period for BAV score calculation (e.g., monthly), and then used to calculate BAV score 320. Thus, environment 300a displays the interactions of data lake 132 with agent data warehouse 136 and certified agent repository 138 that may assist in generating BAV score 320 for an agent using in reporting agent profile 210.

After agent data is pushed by different microservices and uploaded as incoming data to cloud computing file folders in a staging area, batches of data may be processed to convert the data to compressed files and partitioned per tenants and day (or other time period for data KPI value determination). Thereafter, data is refined, and curated data views are generated for aggregating on a daily basis. For example, the refined and structured data may be processed and aggregated to form a curated view for each agent on daily basis that contains the daily aggregated average values for each of KPIs 302 used for calculation of BAV score 320. When determining KPIs 302, KPIs 302 may not be a pure value in aggregating and calculating each KPI, (e.g., may not be an average of KPI values during a time period). Instead, the KPI values may be a percentile value or score of an agent's performance in an employment skill for a particular KPI with respect to the other agents at the same cloud computing tenant during the same time frame. For example, a KPI may be expressed on a range from 0%-100% (or decimals 0-1, with 1 being a highest rated agent's skill level). Thereafter, an average of all such percentile values may be calculated.

In order to compute BAV score 320 from KPIs 302, the cloud computing system may require a talk time score 304, a hold time score 306, or alternatively a digital handle time score for digital communication channels (not shown), or any combination thereof. KPIs 302 used for BAV score 320 computation may further include a first call resolution score 308, a soft skill score 310, an attendance score 312, a sentiment score 314, or any combination thereof. An aggregate processing job for KPIs 302 may be executed to perform daily (or other time period) determination of scores for KPIs 302, where aggregate scores for each of KPIs 302 may be calculated at the end of each day using a daily processing schedule that triggers a processing job to compute an average for each of KPIs 302. A data table for each of KPIs 302 may be updated from the values determined from the processing job, where the data table may further be associated with the agent's unique ID and, in some embodiments, a tenant ID and/or job ID. Flowcharts for calculation of monthly KPI averages for daily aggregated KPI data for talk time score 304, hold time score 306, the alternative digital handle time score for digital communication channels (not shown), first call resolution score 308, soft skill score 310, and sentiment score 314 are shown in further detail with regard to FIGS. 3B-G.

Figure 3B:
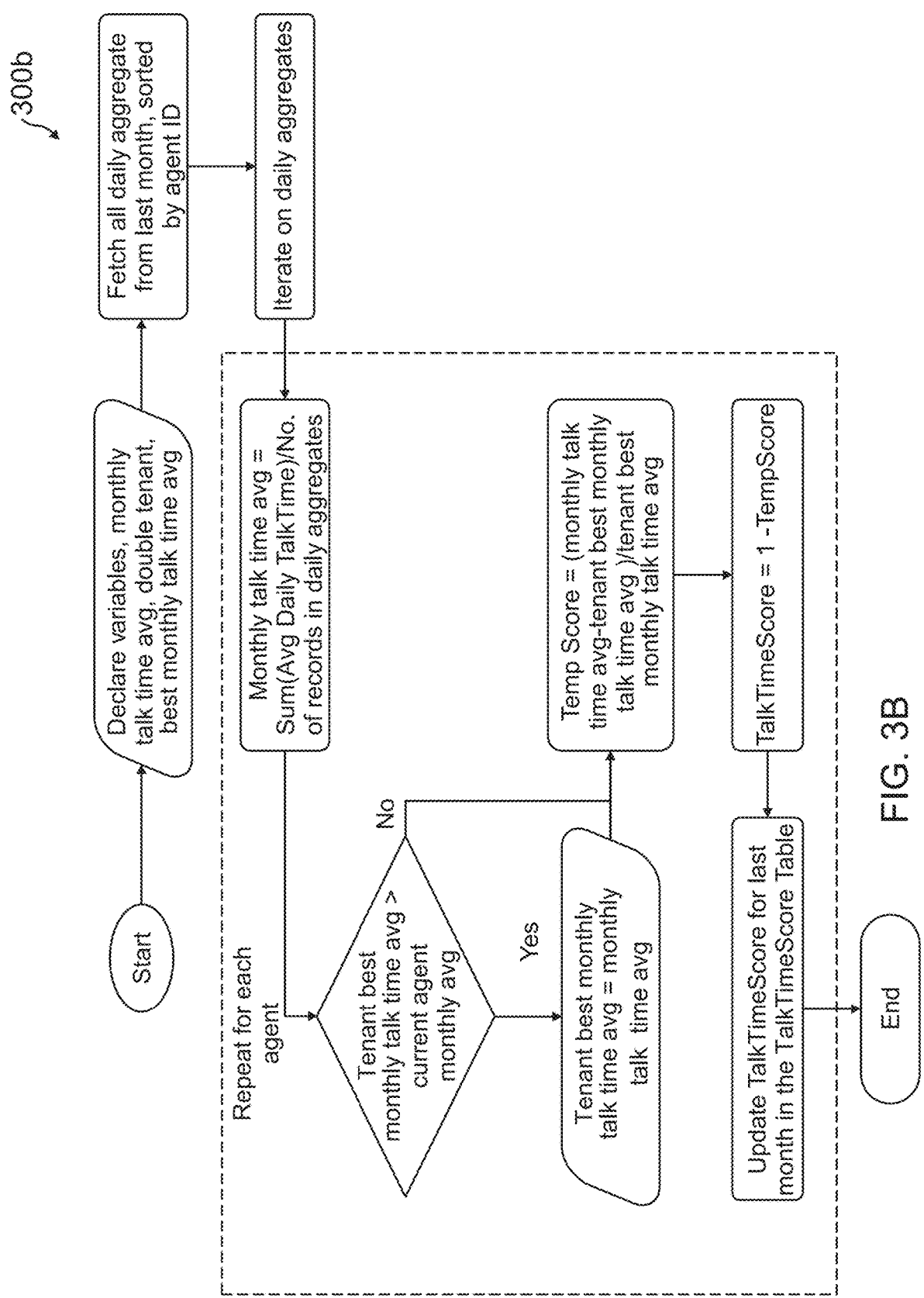
FIG. 3B is a simplified diagram of a flowchart for converting raw data for a talk time key performance indicator to a percentile score according to some embodiments.
Figure 3C:
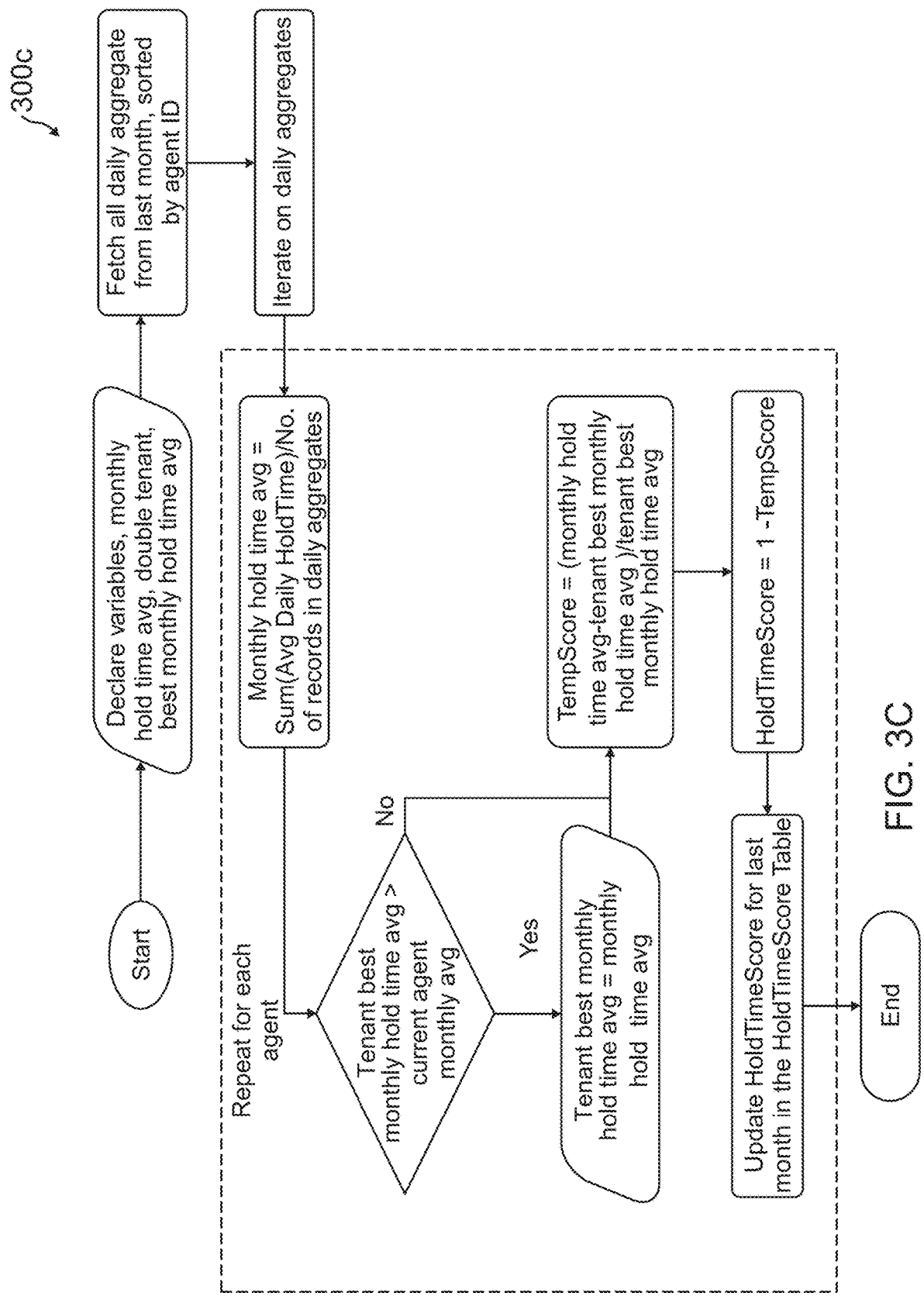
FIG. 3C is a simplified diagram of a flowchart for converting raw data for a hold time key performance indicator to a percentile score according to some embodiments.

FIG. 3B is a simplified diagram of a flowchart for converting raw data for a talk time key performance indicator to a percentile score according to some embodiments. FIG. 3C is a simplified diagram of a flowchart for converting raw data for a hold time key performance indicator to a percentile score according to some embodiments. As shown in flowcharts 300b and 300c of FIGS. 3B and 3c, respectively, when determining talk time score 304 and hold time score 306, average values may be computed from metadata of the corresponding call, including audio or video calls. Thus, talk time score 304 and hold time score 306 may be taken from the metadata, as well as call transcripts where required. Talk time score 304 may also factor in hold times for hold time score 306, such as by subtracting this time from talk times used to determine talk time score 304. Further, incoming and outgoing calls may be handled different and vary in their nature. As such, incoming and outgoing calls may be separately calculated and handled, where a weighted average is then taken. Additionally, all calls or contacts less than a certain amount of time may be ignored, such as if a customer is uninterested in an outgoing call or if an incoming call is cut off.

Figure 3D:
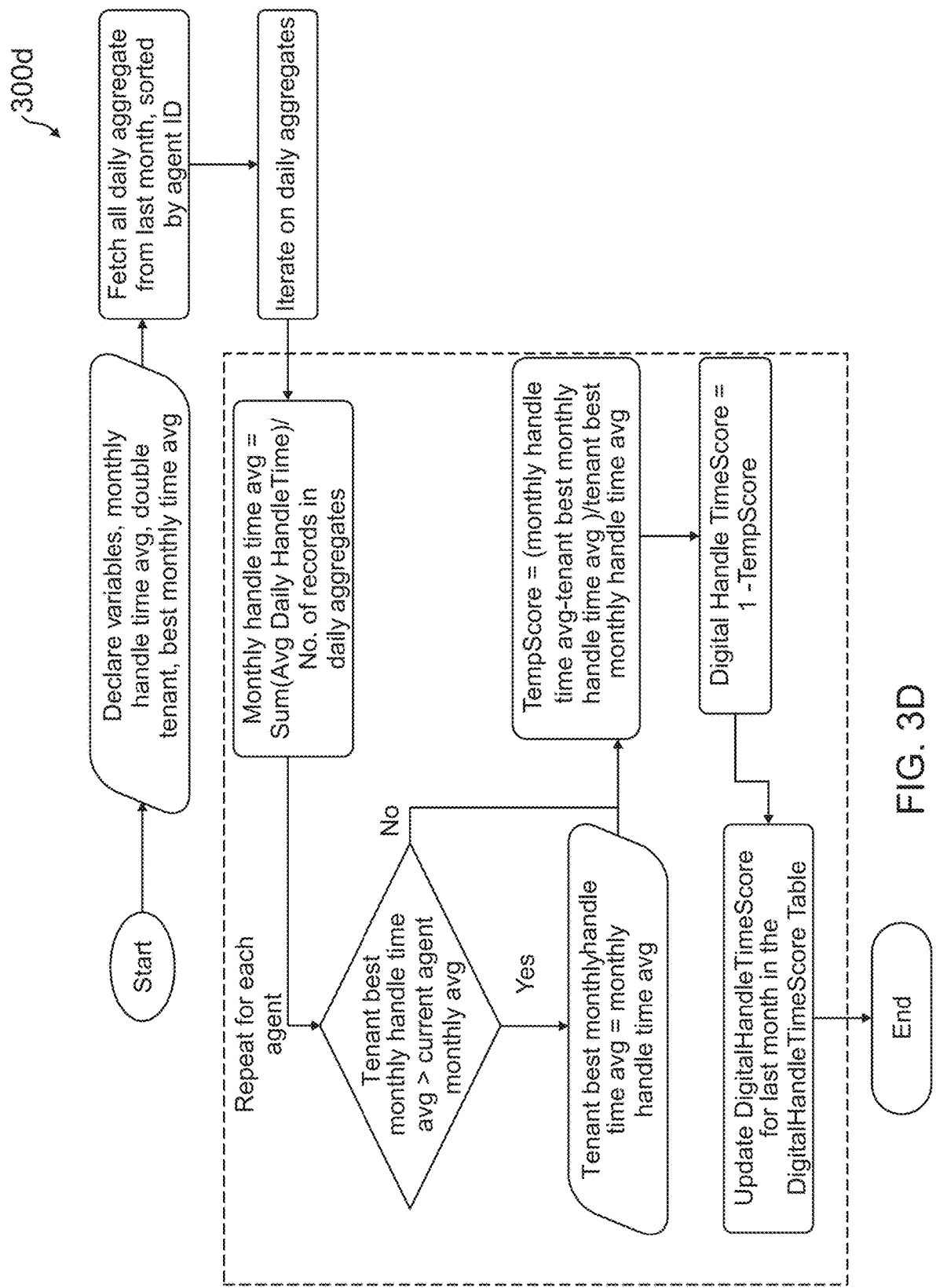
FIG. 3D is a simplified diagram of a flowchart for converting raw data for a digital handle time key performance indicator to a percentile score according to some embodiments.

FIG. 3D is a simplified diagram of a flowchart for converting raw data for a digital handle time key performance indicator to a percentile score according to some embodiments. As shown in flowchart 300d of FIG. 3D, customers of a cloud computing tenant may interact with a company or organization through various modes and/or channels, and thus, agent interaction with these channels may be monitored and tracked over time. However, experience of an audio (e.g., phone call) or digital (e.g., web chat) channel varies. For digital interactions, an average handle time may be a time from opening of communications between the agent and the customer and may account for silent periods where the agent and/or customer may be unavailable or unresponsive.

Figure 3E:
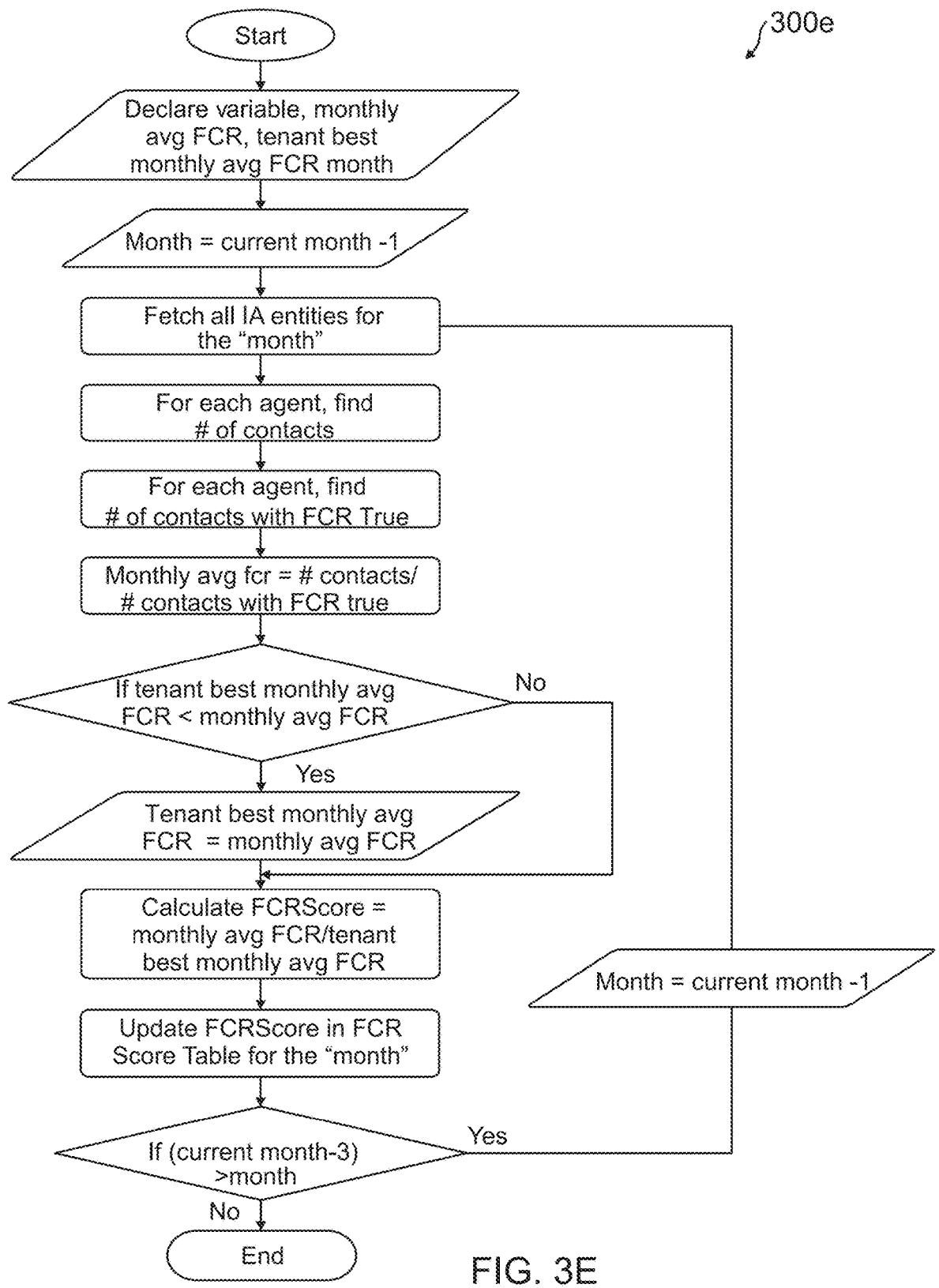
FIG. 3E is a simplified diagram of a flowchart for converting raw data for a first call resolution key performance indicator to a percentile score according to some embodiments.

FIG. 3E is a simplified diagram of a flowchart for converting raw data for a first call resolution key performance indicator to a percentile score according to some embodiments. As shown in flowchart 300e of FIG. 3D, first call resolution (FCR) score 308 may not be aggregated daily, and daily aggregates of first call resolution score 308 may be instead calculated based on aggregated data over a month or other time period. For example, first call resolution score 308 may be an average over a greater time period (e.g., monthly for BAV score determination) and reporting for first call resolutions may be delayed due to customer confirmation or lead time given before a case is considered closed. Thus, flowchart 300e may show an operation that is performed on aggregated data over a longer period than other KPI daily aggregated.

Figure 3F:
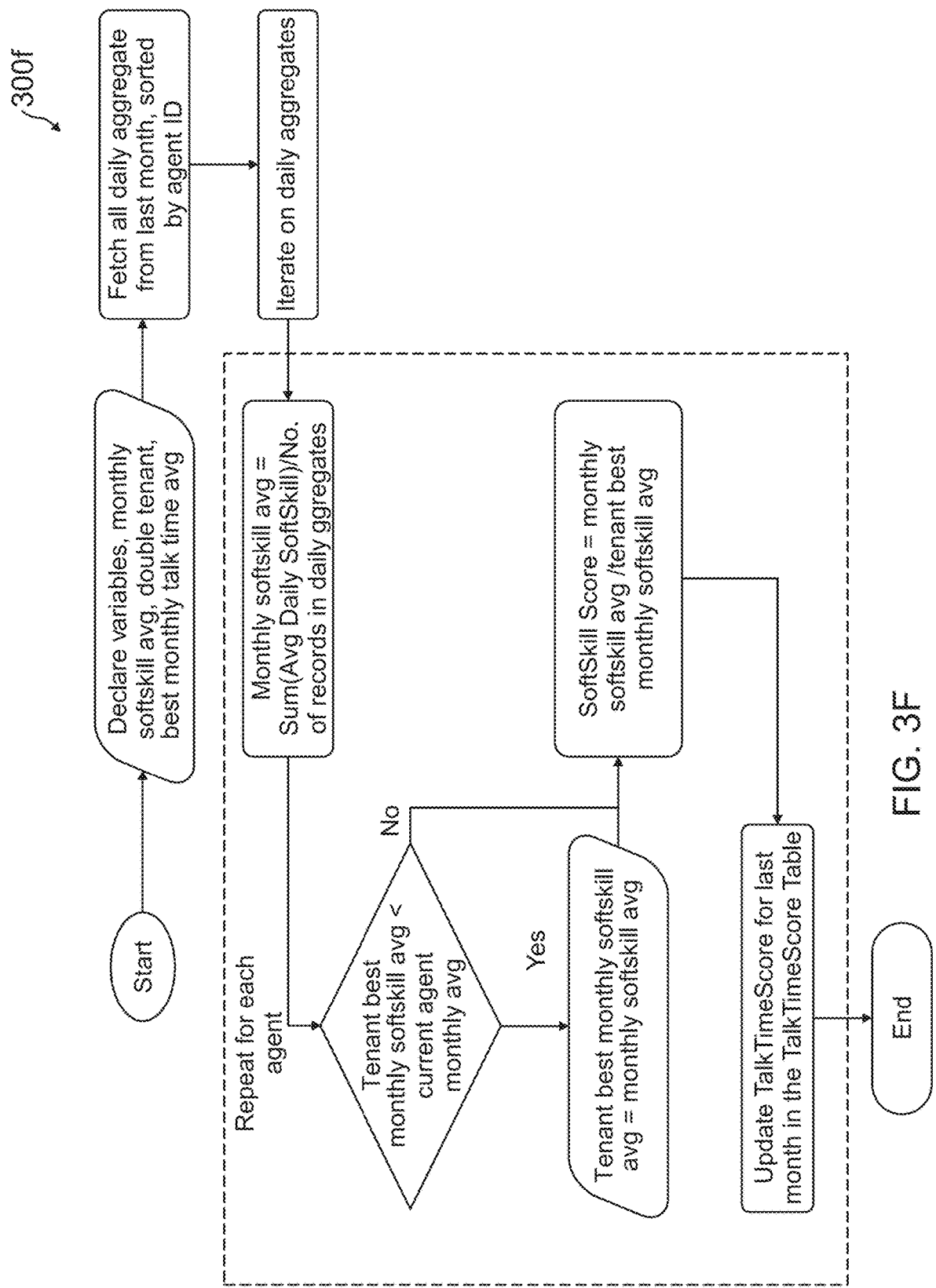
FIG. 3F is a simplified diagram of a flowchart for converting raw data for an agent soft skill key performance indicator to a percentile score according to some embodiments.

FIG. 3F is a simplified diagram of a flowchart for converting raw data for an agent soft skill key performance indicator to a percentile score according to some embodiments. In addition to talk time score 304, hold time score 306, and/or first call resolution score 308, KPIs 302 may include soft skill score 310 that analyzes soft skills of an agent's interactions with customers. As shown in flowchart 300f of FIG. 3F, soft skill score 310 may measure the verbal or linguistic skills an agent has when interacting with a customer to provide a positive customer experience. Soft skill score 310 may include analysis of long silence periods, cross talk (e.g., when the agent is talking over the customer), abusive words and/or phrases used by an agent during voice communications, and the like. With digital interactions, this may instead correspond to, or further include, spelling mistakes, unknown abbreviations used, long silence periods, and/or customer abuse. When analyzing soft skills, a textual analysis engine and service may be used with converted text from phone calls (e.g., using a speech to text capability of a service) and/or chat logs from digital interactions. Thus, a transcript of the interaction may be analyzed for the aforementioned insights into the agent's soft skills. Long silences may be used by analyzing timestamps of speech or text, as well as analysis of audio media files.

Attendance score 312 for a day may be derived from data for time off requests that a shift manager may submit, as well as cancelations of those requests. Thus, marking daily attendance (is or is not present) in the daily aggregates table for attendance score 312 may include data uploads by managers for the corresponding cloud computing tenant. In this regard, attendance score 312 may be determined by identifying if an agent is present and calculating a percentile-based attendance as compared to an agent with a highest or best attendance (e.g., comparing an agent that worked 20 of 20 assigned days in a month to an agent that works 19 or 20 assigned days in that month).

Figure 3G:
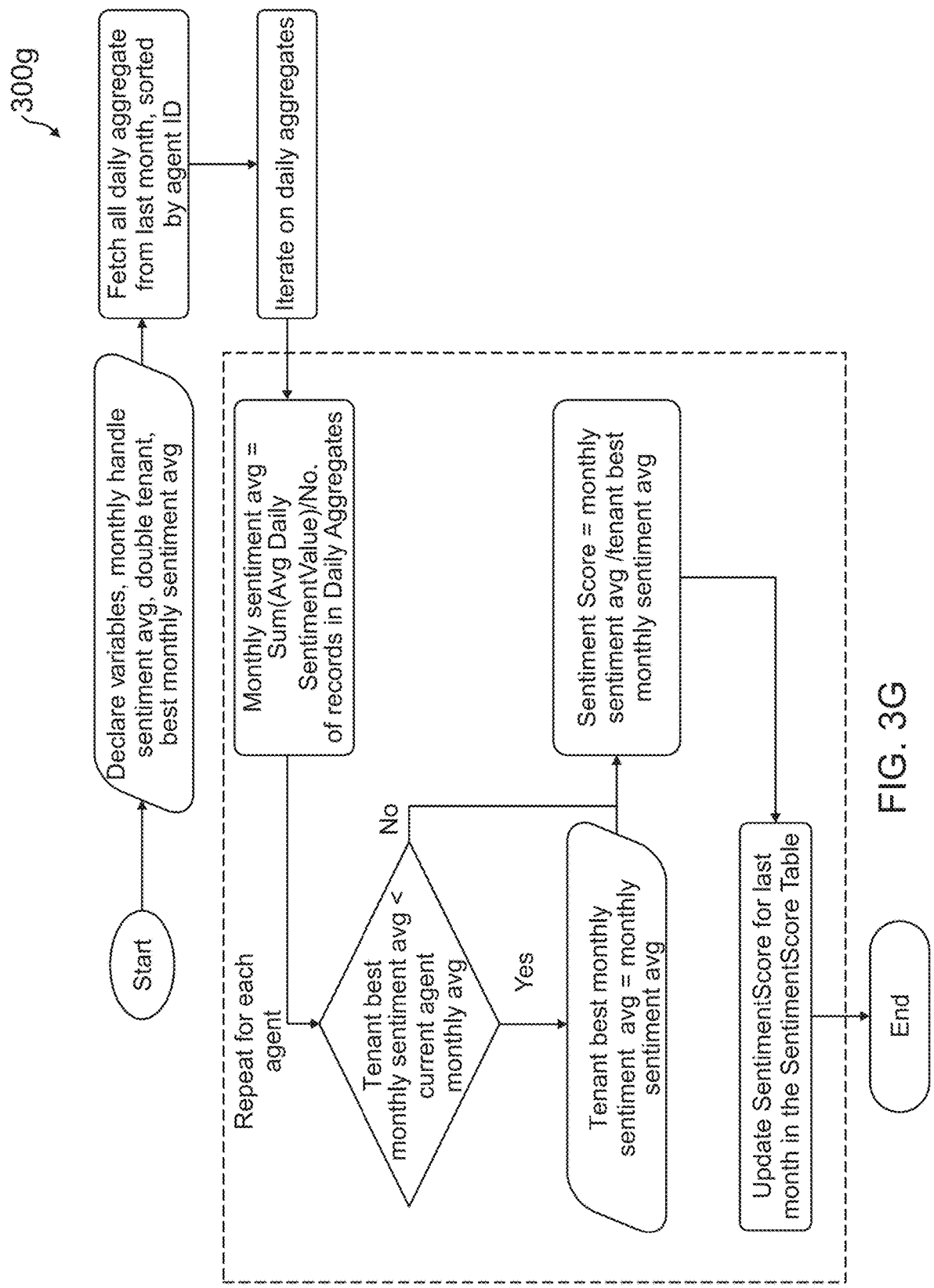
FIG. 3G is a simplified diagram of a flowchart for converting raw data for a talk time key performance indicator to a percentile score according to some embodiments.

FIG. 3G is a simplified diagram of a flowchart for converting raw data for a talk time key performance indicator to a percentile score according to some embodiments. As shown in flowchart 300g of FIG. 3G, sentiment score 314 for one or more interactions by the entity may be calculated using analytics of the customer and agent sentiment after analyzing a call or digital communication transcript. For example, after using a textual analytics engine to analyze a transcript, sentiments for the agent and customer may be determined through analysis of word, phrase, and/or sentence structure, syntax, and/or semantics. An agent and customer sentiment may then be available for each interaction in the form of a POSITIVE/NEGATIVE/MIXED sentiment. To convert these sentiments to numeric values for calculation of sentiment scores 314, the following may be used. A POSITIVE sentiment may be given a 1 for a numeric weightage. For an agent this may correspond to a call that was well-handled, the agent was found proactive and responsive in the call, and/or the call was a good customer experience. For a customer, this may mean the customer was treated well, there was efficient handling of case, and/or the call was a quality experience. A NEGATIVE sentiment may be given a 0 for a numeric weightage. For an agent, this may mean the agent did not talk clearly and with clarity, was abusive to customer, and/or compliance was not followed. For a customer, this may mean the customer was ill-treated and/or did not feel satisfied with the results or assistance. A MIXED sentiment may be given a 0.5 for a numeric weightage. For an agent, this may mean that the agent did well, but the customer was not excited and/or the agent was not able to resolve the issue but was decent with the customer. For a customer, this may mean that the issue was partially resolved but not completely and/or that the customer was not happy or sad/upset with the interaction.

However, customers may be negative and have bias even if the overall interaction was satisfactory. Thus, customer sentiment may be given a lesser weightage to agent sentiment, e.g., if the agent is in a particular industry or on a particular type of calls (e.g., billing or cancellation), for other reasons, or just in general compared to other inputs. Therefore, a sentiment formula for sentiment score 314 may correspond to the following: sentiment value for an interaction=agent sentiment value*0.6+customer sentiment value*0.4. These scores are computed as percentile-based scores where values for KPIs 302 for each agent is compared with the peer agents and with the corresponding cloud computing tenant when deriving BAV score 320. At the end of each month (or other time period) a monthly batch processing job may convert average daily aggregates for the past month into a percentile score for that month by comparing with peer agents during calculation. In order to determine an average KPI value for a specific KPI over a month or other time period, an average may be taken by summing all KPI data points for that KPI (e.g., each daily talk time score 304) and dividing by the number of data points over that month (e.g., 20 if the agent worked 20 days). Further, the score for each of KPIs 302 may be determined by doing a percentile ranking of the agent against peers of the agent's current company or organization (e.g., the cloud computing tenant where the agent is employed). In some embodiments, the overall score for a KPI may be calculated by taking an average of the agent's score with each cloud computing tenant where the agent has worked. Thereafter, in order to compute BAV score 320 for each agent from the, e.g., daily aggregates, on a monthly basis, the monthly average KPI values for each agent may be calculated and then BAV score 320 may be derived as a percentile with respect to the KPI averages for that month, as shown in FIG. 4.

Figure 4:
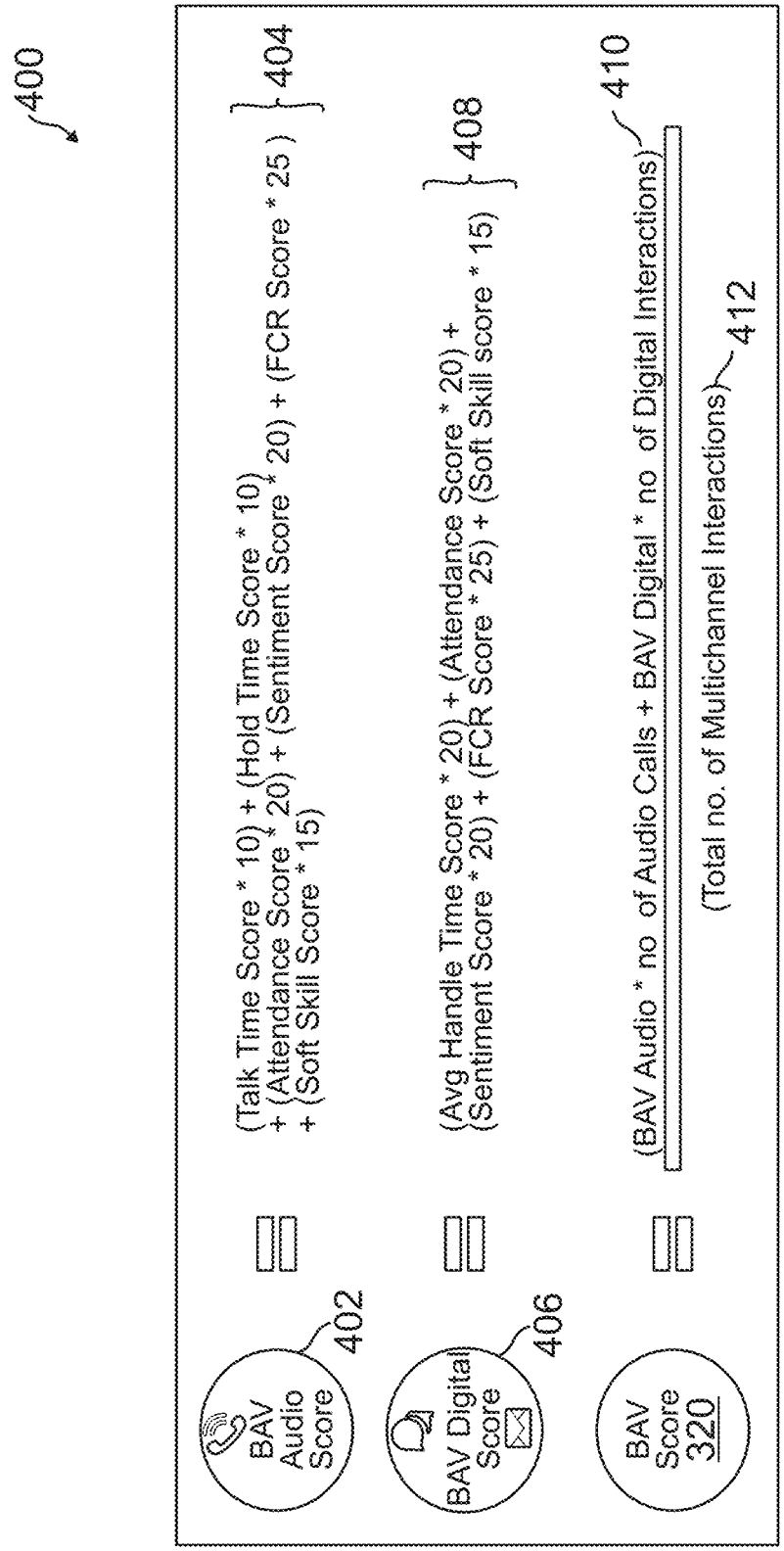
FIG. 4 is a simplified diagram of a base asset value calculation in a cloud computing environment based on tracked agent data according to some embodiments.

FIG. 4 is a simplified diagram of a base asset value calculation in a cloud computing environment based on tracked agent data according to some embodiments. Environment 400 of FIG. 4 displays BAV score 320 calculated from KPIs 302 from FIG. 3A according to one proposed weighted formula. However, it is understood that different weights may be used, and the formula or technique used to calculate BAV score 320 may be adjusted or different, as further discussed herein. Data for KPIs 302 may be collected and aggregated over a time period as discussed with reference to FIG. 3A, for example, based on accumulated agent data over a pay period, a month, a quarter, or any other review cycle. Thereafter, BAV score 320 may be calculated as follows.

As previously discussed, an experience of a customer with an agent via an audio (e.g., phone call) or digital (e.g., web chat, email, social networking, and the like) channel varies. Thus, a BAV score may be initially calculated separately for each channel before calculating BAV score 320 as a weighted average of both audio and digital channel BAV scores. As shown in environment 400, a BAV audio score 402 and a BAV digital score 406 have different individual techniques to calculate their respective weighted outputs for BAV score 320. In order to calculate BAV audio score 402 and BAV digital score 406, the scores are calculated for each of the considered KPIs 302 from FIG. 3A.

When calculating BAV audio score 402, an audio weighted average 404 of the relevant KPIs may be used. This may be as follows: BAV audio score 402=(Talk Time Score*10)+(Hold Time Score*10)+(Attendance Score*20)+(Sentiment Score*20)+(First Call Resolution (FCR) Score*25)+(Soft Skill Score*15).

When calculating BAV digital score 406, a digital weighted average 408 of the relevant KPIs may be used. This may be as follows: BAV digital score 406=(Average Digital Handle Time Score*20)+(Attendance Score*20)+(Sentiment Score*20)+(FCR Score*25)+(Soft Skill Score*15).

Thereafter, when calculating BAV score 320 as a weighted average of BAV audio score 402 and BAV digital score 406, BAV score 320 may be calculated by dividing an overall BAV sum 410 of (BAV audio score 402\*number of audio calls)+(BAV digital score 406\*number of digital interactions) by a total number of multichannel interactions 412, or the total number of interactions that the agent has through both audio and digital channels over a time period (e.g., monthly). This may be as follows: BAV score 320=[(BAV audio score 402\*number of audio calls)+(BAV score 406\*number of digital interactions)]/(Total number of multichannel interactions 412).

Weights may be utilized as multiplicative factors for determination of BAV score 320. Weights may balance an impact of each of KPIs 302 to the overall score determination and allow more important KPIs to have more impact in BAV score 320. However, the weights may be adjusted and/or intelligently determined as necessary based on tenant requirements, historical data, and the like. The weights may be determined by conducting a survey with cloud computing tenants in order to determine a priority of attributing KPIs to BAV score 320. The participants of these surveys can be existing cloud computing tenants, as well as potential cloud computing tenants. This survey may be run annually or at different time periods as may be required for updating the calculation of BAV score 320. Thus, the weights may be determined as a mean percentage for each KPI and then a final weightage may be considering during determination of the BAV score.

As previously discussed, calculation of BAV audio score 402, BAV digital score 406, and BAV score 320 may be performed across agents of the cloud computing tenants (as well as for prospective agents and/or prospective cloud computing tenants) in monthly batch processing jobs, however, different time periods may also be used. Thereafter, BAV score 320 and other averaged KPIs and BAV scores may be made available via certified agent repository 138. A client device, such as tenant device 110, or other device or server, may access the available KPIs and BAV scores through one or more user interfaces. These user interfaces may be used to enter an agent's unique ID, retrieve BAV scores and/or KPIs, as well as enter other agent unique IDs and/or team unique IDs (e.g., for a team of agents). This allows for comparison between different agents within one or more visualizations.

For an agent, an agent skill profile may be created as a unique view that shows the details of the skills, skill distributions, and changes in skills over time based on the agent's experience. This profile view further keeps a count of the contacts, calls, and other interactions that the agent handled in a particular time period. Further, the profile view provides a heat map of the agent experience with different skills as compared between those different skills, jobs, agents (e.g., peer agents within a group, organization, or the like), or any combination thereof. The processing job to determine the agent skill profile may also be run once a month and may reference back to previous months.

Thus, a comprehensive report may be generated that displays the BAV score, a comparison of the BAV score of the agent with similar team members and/or candidates, a trend of the agent's performance over a period of time for each of the KPIs, and the like. This allows for determination of each agent's unique BAV score. These may be calculated using metrics which may be available between tenants of the cloud computing environment, thereby increasing agent availability. The BAV score may be calculated by comparing the agent with peer groups corresponding to their current cloud computing tenant and/or work domain (e.g., sales, help or assistance, and the like). This may assist in comparing agents across different cloud computing tenants and work domains. Further, metrics may be expressed as percentile scores of KPIs and BAVs in order to standardize scoring between peer agents and prevent exposure of proprietary data of cloud computing tenant metrics to others. This may protect security and privacy concerns of the proprietary data of cloud computing tenants. Thus, BAV scores may be computed using data of the same agent across different cloud computing tenancies over multiple years, which assists in providing a more holistic and objective metric.

Figure 5:
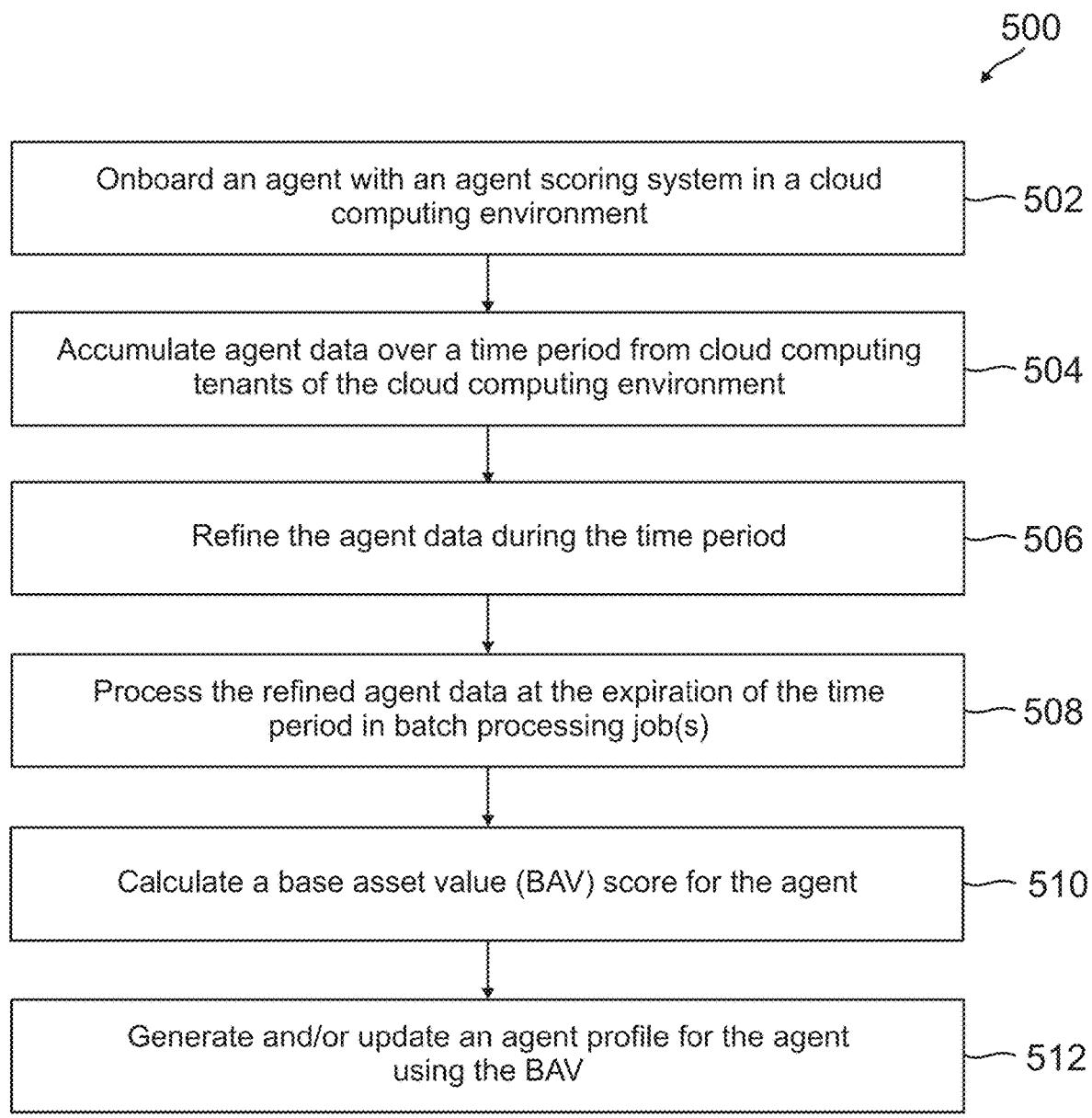
FIG. 5 is a simplified diagram of a method for cross-tenant data tracking and processing for base asset value calculation in a cloud computing environment according to some embodiments.

FIG. 5 is a simplified diagram of a method for cross-tenant data tracking and processing for base asset value calculation in a cloud computing environment according to some embodiments. Note that one or more steps, processes, and methods described herein of method 500 may be omitted, performed in a different sequence, or combined as desired or appropriate. In some embodiments, generating BAV scores described in method 500 of FIG. 5 can be implemented and performed using cloud computing system 120. One or more of the steps 502-512 of method 500 may be implemented, at least in part, in the form of executable code stored on non-transitory, tangible, machine-readable media that when run by one or more processors may cause the one or more processors to perform one or more of the steps 502-512. In some embodiments, method 500 can be performed by one or more computing systems in environment 100 of FIG. 1.

At step 502 of method 500, an agent is onboarded with an agent scoring system in a cloud computing environment, such as one provided by cloud computing system 120. This onboarding may occur when the agent first registers for a unique ID for an agent account with the cloud computing environment. Further, the onboarding may occur as the result of employment by the agent with a cloud computing tenant's organization that utilizes services provided via the cloud computing environment. A unique ID for an agent may be generated by utilizing some data for the agent with randomized alphanumeric characters. For example, an initial system identifier for the cloud computing environment and/or tenant may be used with an onboarding date and a number of randomized letters and/or numbers. In various embodiments, generation of the unique ID or a portion of the unique ID may utilize randomization and/or hashing techniques designed to prevent collision between unique IDs. Where the agent already has a unique ID assigned to the agent, the agent need not be onboarded but instead method 500 may proceed to step 502 after identification of the agent's unique ID and corresponding profile.

At step 504, agent data for the agent is accumulated over a time period from cloud computing tenants of the cloud computing environment. The agent data may come from one specific tenant where the agent is employed, or multiple tenants if the agent moves employment during the time period. The agent data may include the data that is relevant to the agent's skills at their employment, including those KPIs that may be used to objectively measure an agent's skills at particular tasks and responsibilities of the agent. The agent data may come from multi-tenant applications used by the agent's tenant from the cloud computing environment, as well as external sources of information, such as customer surveys and the like. Thereafter, once the data is accumulated and transferred to a data processing area, at step 506, the agent data is refined during the time period to curated data views. For example, the data may be compressed and scrubbed of unnecessary information so that the data is standardized for processing jobs performed in the cloud computing environment (e.g., big data batch processing jobs). This may further include daily aggregations of refined data. In this regard, daily KPI averages may be calculated based on the refined agent data so that it is available for later month-end processing.

At step 508, at the expiration of the time period, the refined agent data is processed in one or more batch processing jobs. The processing of the refined agent data may correspond to collecting and averaging of the refined agent data that is available in a data warehouse for calculation of a BAV score. For example, daily KPI values for each relevant KPI for a BAV score may be averaged over the time period (e.g., in one or more processing jobs) so that monthly KPI averages are determined. Once processed, at step 510, a BAV score for an agent is calculated. Calculation of BAV scores may be done using a weighted technique that assigns different KPIs more or less weight in BAV score determination based on relative importance. Thus, a BAV score may utilize a calculation based on the individual assigned weights.

Using the BAV score, at step 512, an agent profile is generated and/or updated. The agent profile may include past BAV scores and KPIs. Thus, the agent profile may include a new data point for the new BAV score within the agent profile, which may change the agent's current BAV score as a new weighted average of lifetime BAV scores (or, at least, over a recent time period, such as a last year BAV score). In some embodiments, the new BAV score may be assigned as the agent's overall BAV score. Further, past KPI score values may be updated with the agent's most recent KPI values, which may affect calculation of an overall BAV score for the agent. The agent profile may also include initial comparisons of the agent to peer groups, such as within the same or similar working group, similar cloud computing tenant organizations, and the like. This allows for objective comparison of the agent between different cloud computing tenants.

Figure 6:
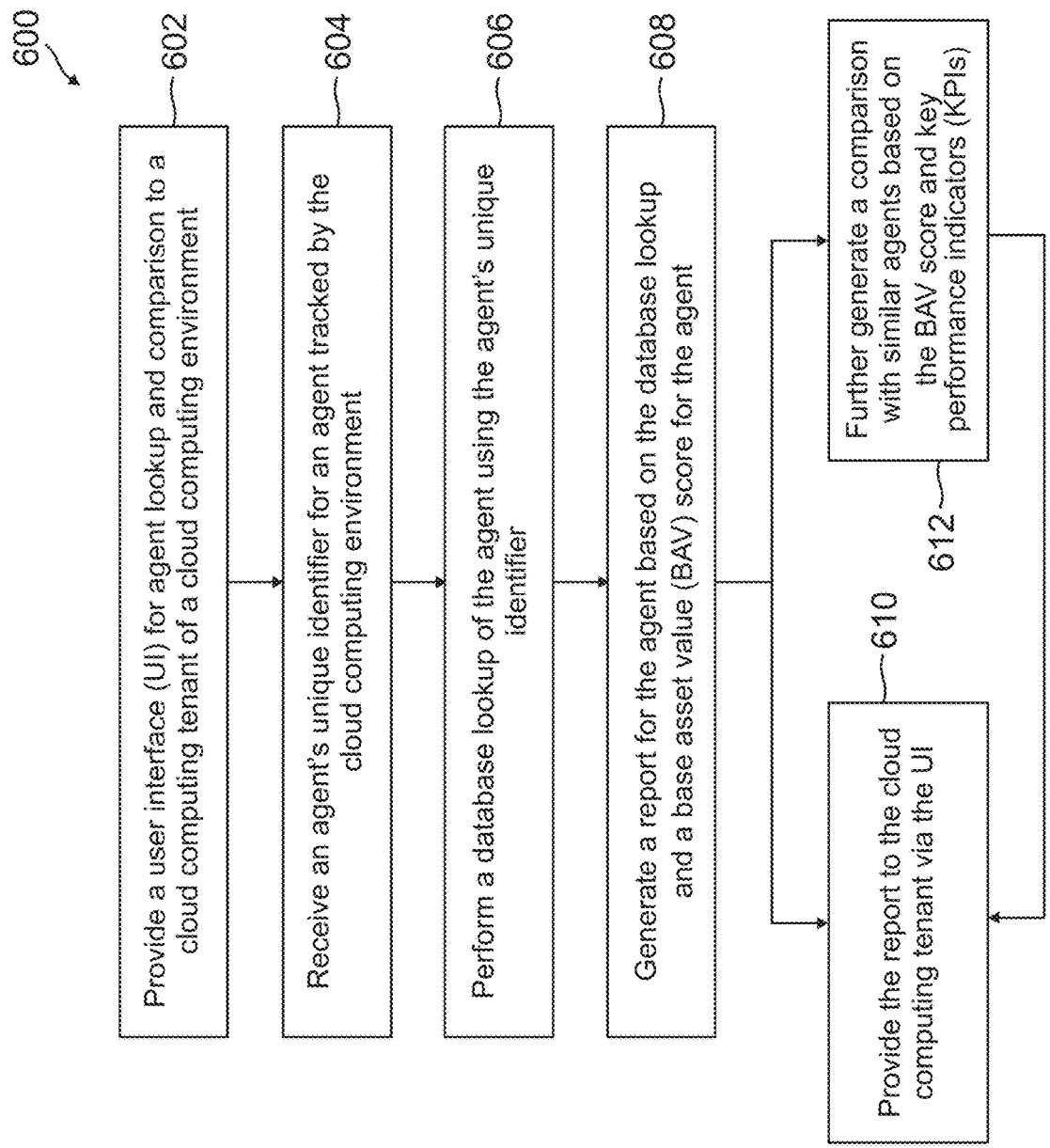
FIG. 6 is a simplified diagram of a method for agent data comparison using calculated base asset values from a cloud computing environment according to some embodiments.

FIG. 6 is a simplified diagram of a method for agent data comparison using calculated base asset values from a cloud computing environment according to some embodiments. Note that one or more steps, processes, and methods described herein of method 600 may be omitted, performed in a different sequence, or combined as desired or appropriate. In some embodiments, the generation and provision of a report for an agent based on a BAV score described in method 600 of FIG. 6 can be implemented and performed using cloud computing system 120. One or more of the processes 602-612 of method 600 may be implemented, at least in part, in the form of executable code stored on non-transitory, tangible, machine-readable media that when run by one or more processors may cause the one or more processors to perform one or more of the processes 602-612. In some embodiments, method 600 can be performed by one or more computing systems in environment 100 of FIG. 1.

At step 602 of method 600, a user interface (UI) for agent lookup and comparison is provided to a cloud computing tenant of a cloud computing environment. The UI may correspond to one or multiple different UIs that allow for a member of the cloud computing tenant (e.g., a member involved with hiring and/or analyzing agents in an organization) to enter a specific unique ID for an agent and retrieve database records for the agent. Further the UI(s) may allow for entry of additional unique IDs for other agents or teams of agents that allows for comparison of the agent to different peer agents. Thus, at step 604, an agent's unique ID for an agent that is tracked by the cloud computing environment is received. The agent's unique ID may be an alphanumeric sequence or code that unique identifies the agent within the cloud computing environment for purposes of data tracking and agent profile generation.

At step 606, a database lookup of the agent is performed using the agent's unique ID. The database lookup may correspond to a cross-reference of database records and tables in a certified agent repository that includes averaged KPI scores over time for the agent and BAV scores calculated using those averaged KPI scores. Therefore, the agent's unique ID may be used to perform these database lookups and queries, which identifies processed agent data in the database records. Thereafter, at step 608, a report is generated for the agent based on the database lookup and a BAV for the agent. The report may correspond to information identifying the agent and the agent's BAV score. The report may also include individual KPI scores, as well as changes to KPI and BAV scores over time. The report may identify previous employment of the agent and KPI/BAV scores with different employers and/or jobs. Further, the report may identify peers of the agent and/or peer groups (e.g., employment categories), which may be used to compare the agent to other agents. The report may further include a heatmap of the agent's skills identified from the agent's averaged KPI scores and BAV scores, as well as changes to those scores over time. For example, the heatmap may identify the agent's strength and weaknesses generally and/or as compared with the tracked KPIs and peer agents, and may also include information of changes (e.g., increases and/or decreases) over time to KPIs and BAV scores.

If no comparison is requested, at step 610, the report is provided to the cloud computing tenant via the UI. The UI may provide the report, heatmaps from the report, and the like that may be browsed through the UI and/or additional UIs. However, if the cloud computing tenant has further requested a comparison to other agents and/or groups of agents, at step 612, a comparison is further generated with similar agents based on the BAV score and KPIs for all agents in the comparison. The comparison may therefore correspond to a ranking of the agent's BAV score to the BAV score of the other agents (e.g., a score comparison, a percentile that the agent may fall in, a numeric or tiered ranking, or the like). The comparison may also compare each KPI of the agent to the other agents so that individual skills may be compared. This may include a heatmap or other visualization for comparison of agent skills.

As discussed above and further emphasized here, FIGS. 1, 2A-F, 3A-G, 4, 5, and 6 are merely examples of cloud computing system 120 and corresponding methods for performing cross-tenant data processing for agent data comparison, which examples should not be used to unduly limit the scope of the claims. One of ordinary skill in the art would recognize many variations, alternatives, and modifications.

Figure 7:
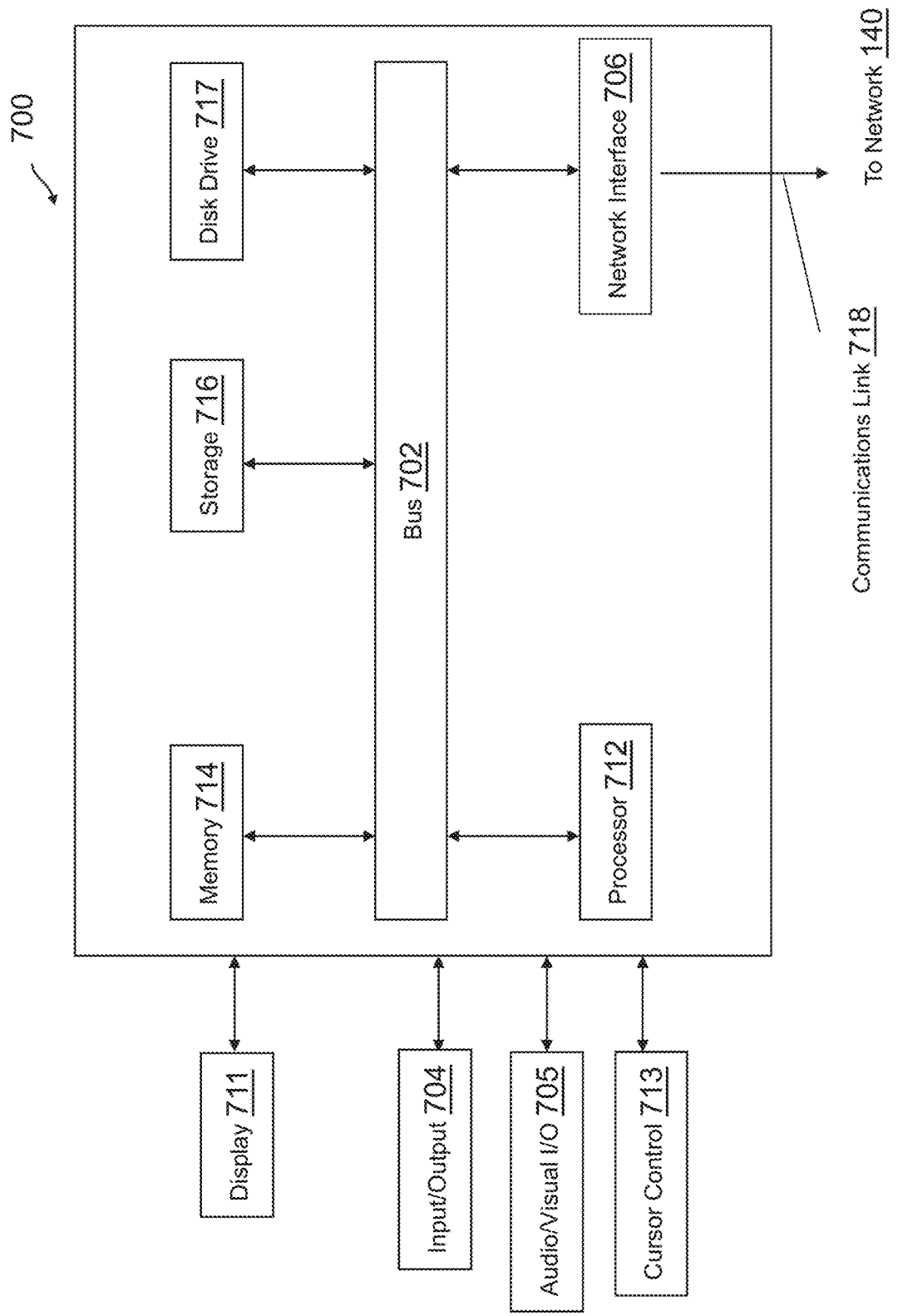
FIG. 7 is a simplified diagram of a computing device according to some embodiments.

FIG. 7 is a block diagram of a computer system suitable for implementing one or more components in FIGS. 1, 2A, and/or 2B, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a service provider server via network 140. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A cloud computing system configured to perform data processing and tracking of agent data between cloud computing tenants, the cloud computing system comprising:
  a processor and a computer readable medium operably coupled thereto, the computer readable medium comprising a plurality of instructions stored in association therewith that are accessible to, and executable by, the processor, to perform agent scoring operations which comprise:
    streaming, using a plurality of data streams of the cloud computing system from different cloud-based applications, microservices, or both, the agent data to a data lake, wherein the streaming includes:
      providing a plurality of application programming interfaces (APIs) that provide create and update operations for streaming the agent data to the data lake by the different cloud-based applications, microservices, or both,
      receiving a data push of the agent data from the different cloud-based applications, microservices, or both using the create and update operations via the plurality of APIs, and
      storing the agent data as raw data in one or more data containers in the data lake, and wherein the agent data is associated with at least a unique identifier (ID) of an agent corresponding to a first cloud computing tenant of the cloud computing tenants;
    accumulating, over a time period in the data lake based on the data streams, the agent data for at least the agent, wherein the agent data is associated with a plurality of key performance indicators (KPIs) for performance metrics tracked for the agent for the time period;

refining the agent data to curated data views for the agent data based on a plurality of aggregate reports for each of the plurality of KPIs, wherein the refining the agent data includes:

computing the plurality of KPIs from the raw data, and converting the computed plurality of KPIs to a plurality of percentile-based scores used for the plurality of aggregate reports, wherein the percentile based scores expose raw scores or average scores of the agent only to other users belonging to the first cloud computing tenant;

determining a batch processing job at an expiration of the time period for the refined agent data;

calculating, using the batch processing job, a base asset value (BAV) score for the agent over the time period based on a weighted scoring technique and the refined agent data;

updating a profile for the agent associated with the unique ID based on the calculated BAV score;

receiving, from a reporting tool that provides an analytical report of the agent, a lookup request comprising the unique ID of the agent;

querying a database of the cloud computing system for the profile based on the lookup request, wherein the querying includes performing a database lookup of a database record corresponding to the unique ID from a database table;

executing a processing job that generates the analytical report by computing comparisons of the agent to a plurality of agents based on the plurality of BAV scores and the individual KPIs, wherein the processing jobs standardizes data between the plurality of BAV scores and the individual KPIs for the analytical report;

generating a visualization of the analytical report for the profile, wherein the visualization includes one or more heatmaps comparing the BAV score and the percentile based scores of the agent to the plurality of agents; and outputting, via a user interface of the reporting tool, the visualization of the analytical report.

2. The cloud computing system of claim 1, wherein the weighted scoring technique comprises a plurality of individual weights to apply to each of the plurality of KPIs shared between the cloud computing tenants.

3. The cloud computing system of claim 1, wherein the agent scoring operations further comprise:

determining a candidate report comprising at least one analytic based on the calculated BAV score, the plurality of KPIs for the agent, or both, wherein the candidate report provides the at least one analytic for potential employment of the agent with the one of the cloud computing tenants; and providing the candidate report to the one of the cloud computing tenants via the visualization of the analytical report in the user interface.

4. The cloud computing system of claim 3, wherein the agent scoring operations further comprise:

receiving, from the one of the cloud computing tenants, a plurality of unique IDs for the plurality of agents or a team ID for the plurality of agents;

performing at least one additional database lookup for one or more additional profiles of the plurality of agents in the certified agent repository using the plurality of unique IDs or the team ID, or both, wherein the one or more additional profiles comprise an additional BAV score for each of the plurality of agents; and displaying the one or more additional profiles via the visualization.

5. The cloud computing system of claim 1, wherein the analytical report comprises a percentile score change of the calculated BAV score of the agent from one or more past BAV scores of the agent in the updated profile, wherein the percentile score change indicates a performance over time metric of the agent, and wherein the calculated BAV score is calculated based on a comparison with a peer group of agents.

6. The cloud computing system of claim 1, wherein accumulating, over the time period, the agent data comprises:

converting one or more data containers including the agent data to compressed files for refining the agent data.

7. The cloud computing system of claim 1, wherein the plurality of KPIs comprise at least a talk time KPI, handle time KPI, a hold time KPI, a first call resolution KPI, a soft skill KPI, an attendance KPI, and sentiment KPI, or any combination of the foregoing, and wherein the BAV score for the agent is calculated based on a weighted average of a phone call-specific BAV and a digital channel-specific BAV.

8. The cloud computing system of claim 1, wherein the refined agent data is further for the plurality of agents, wherein calculating the BAV score comprises calculating a plurality of BAV scores for the plurality of agents using the batch processing job, and wherein the agent scoring operations further comprise:

providing a ranking of the agent in comparison to the plurality of agents based on the calculated BAV score for the agent and the plurality of calculated BAV scores for the plurality of agents.

9. A method to perform data processing and tracking of agent data between cloud computing tenants of a cloud computing system, the method comprising:

streaming, using a plurality of data streams of the cloud computing system from different cloud-based applications, microservices, or both, the agent data to a data lake, wherein the streaming includes:

providing a plurality of application programming interfaces (APIs) that provide create and update operations for streaming the agent data to the data lake by the different cloud-based applications, microservices, or both, receiving a data push of the agent data from the different cloud-based applications, microservices, or both using the create and update operations via the plurality of APIs, and storing the agent data as raw data in one or more data containers in the data lake, and wherein the agent data is associated with at least a unique identifier (ID) of an agent corresponding to a first cloud computing tenant of the cloud computing tenants;

accumulating, over a time period in the data lake based on the data streams, the agent data for at least the agent, wherein the agent data is associated with a plurality of key performance indicators (KPIs) for performance metrics tracked for the agent for the time period;

refining the agent data to curated data views for the agent data based on a plurality of aggregate reports for each of the plurality of KPIs, wherein the refining the agent data includes:

computing the plurality of KPIs from the raw data, and
converting the computed plurality of KPIs to a plurality of percentile-based scores used for the plurality of aggregate reports, wherein the percentile based scores expose raw scores or average scores of the agent only to other users belonging to the first cloud computing tenant;
determining a batch processing job at an expiration of the time period for the refined agent data;
calculating, using the batch processing job, a base asset value (BAV) score for the agent over the time period based on a weighted scoring technique and the refined agent data;
updating a profile for the agent associated with the unique ID based on the calculated BAV score;
receiving, from a reporting tool that provides an analytical report of the agent, a lookup request comprising the unique ID of the agent;
querying a database of the cloud computing system for the profile based on the lookup request, wherein the querying includes performing a database lookup of a database record corresponding to the unique ID from a database table;
executing a processing job that generates the analytical report by computing comparisons of the agent to a plurality of agents based on the plurality of BAV scores and the individual KPIs, wherein the processing jobs standardizes data between the plurality of BAV scores and the individual KPIs for the analytical report;
generating a visualization of the analytical report for the profile, wherein the visualization includes one or more heatmaps comparing the BAV score and the percentile based scores of the agent to the plurality of agents; and
outputting, via a user interface of the reporting tool, the visualization of the analytical report.

10. The method of claim 9, wherein the weighted scoring technique comprises a plurality of individual weights to apply to each of the plurality of KPIs shared between the cloud computing tenants.

11. The method of claim 9, further comprising:
determining a candidate report comprising at least one analytic based on the calculated BAV score, the plurality of KPIs for the agent, or both, wherein the candidate report provides the at least one analytic for potential employment of the agent with the one of the cloud computing tenants; and
providing the candidate report to the one of the cloud computing tenants via the visualization of the analytical report in the user interface.

12. The method of claim 11, further comprising:
receiving, from the one of the cloud computing tenants, a plurality of unique IDs for the plurality of agents or a team ID for the plurality of agents;
performing at least one additional database lookup for one or more additional profiles of the plurality of agents in the certified agent repository using the plurality of unique IDs or the team ID, or both, wherein the one or more additional profiles comprise an additional BAV score for each of the plurality of agents; and
displaying the one or more additional profiles via the visualization.

13. The method of claim 9, wherein the analytical report comprises a percentile score change of the calculated BAV score of the agent from one or more past BAV scores of the agent in the updated profile, wherein the percentile score change indicates a performance over time metric of the agent, and wherein the calculated BAV score is calculated based on a comparison with a peer group of agents.

14. The method of claim 9, wherein accumulating, over the time period, the agent data comprises:
converting one or more data containers including the agent data to compressed files for refining the agent data.

15. The method of claim 9, wherein the plurality of KPIs comprise at least a talk time KPI, handle time KPI, a hold time KPI, a first call resolution KPI, a soft skill KPI, an attendance KPI, and sentiment KPI, or any combination of the foregoing, and wherein the BAV score for the agent is calculated based on a weighted average of a phone call-specific BAV and a digital channel-specific BAV.

16. The method of claim 9, wherein the refined agent data is further for the plurality of agents, wherein calculating the BAV score comprises calculating a plurality of BAV scores for the plurality of agents using the batch processing job, and wherein the method further comprises:
providing a ranking of the agent in comparison to the plurality of agents based on the calculated BAV score for the agent and the plurality of calculated BAV scores for the plurality of agents.

17. A non-transitory computer-readable medium having stored thereon computer-readable instructions executable to perform data processing and tracking of agent data between cloud computing tenants of a cloud computing system, the computer-readable instructions executable to perform agent scoring operations which comprises:
streaming, using a plurality of data streams of the cloud computing system from different cloud-based applications, microservices, or both, the agent data to a data lake, wherein the streaming includes:
providing a plurality of application programming interfaces (APIs) that provide create and update operations for streaming the agent data to the data lake by the different cloud-based applications, microservices, or both,
receiving a data push of the agent data from the different cloud-based applications, microservices, or both using the create and update operations via the plurality of APIs, and
storing the agent data as raw data in one or more data containers in the data lake, and wherein the agent data is associated with at least a unique identifier (ID) of an agent corresponding to a first cloud computing tenant of the cloud computing tenants;
accumulating, over a time period in the data lake based on the data streams, the agent data for at least the agent, wherein the agent data is associated with a plurality of key performance indicators (KPIs) for performance metrics tracked for the agent for the time period;
refining the agent data to curated data views for the agent data based on a plurality of aggregate reports for each of the plurality of KPIs, wherein the refining the agent data includes:
computing the plurality of KPIs from the raw data, and
converting the computed plurality of KPIs to a plurality of percentile-based scores used for the plurality of aggregate reports, wherein the percentile based scores expose raw scores or average scores of the agent only to other users belonging to the first cloud computing tenant;
determining a batch processing job at an expiration of the time period for the refined agent data;

calculating, using the batch processing job, a base asset value (BAV) score for the agent over the time period based on a weighted scoring technique and the refined agent data;

updating a profile for the agent associated with the unique ID based on the calculated BAV score;

receiving, from a reporting tool that provides an analytical report of the agent, a lookup request comprising the unique ID of the agent;

querying a database of the cloud computing system for the profile based on the lookup request, wherein the querying includes performing a database lookup of a database record corresponding to the unique ID from a database table;

executing a processing job that generates the analytical report by computing comparisons of the agent to a plurality of agents based on the plurality of BAV scores and the individual KPIs, wherein the processing jobs standardizes data between the plurality of BAV scores and the individual KPIs for the analytical report;

generating a visualization of the analytical report for the profile, wherein the visualization includes one or more heatmaps comparing the BAV score and the percentile based scores of the agent to the plurality of agents; and outputting, via a user interface of the reporting tool, the visualization of the analytical report.

18. The non-transitory computer-readable medium of claim 17, wherein the weighted scoring technique comprises a plurality of individual weights to apply to each of the plurality of KPIs shared between the cloud computing tenants.

19. The non-transitory computer-readable medium of claim 17, wherein the agent scoring operations further comprise:

determining a candidate report comprising at least one analytic based on the calculated BAV score, the plurality of KPIs for the agent, or both, wherein the candidate report provides the at least one analytic for potential employment of the agent with the one of the cloud computing tenants; and providing the candidate report to the one of the cloud computing tenants via the visualization of the analytical report in the user interface.

20. The non-transitory computer-readable medium of claim 19, wherein the agent scoring operations further comprise:

receiving, from the one of the cloud computing tenants, a plurality of unique IDs for the plurality of agents or a team ID for the plurality of agents;

performing at least one additional database lookup for one or more additional profiles of the plurality of agents in the certified agent repository using the plurality of unique IDs or the team ID, or both, wherein the one or more additional profiles comprise an additional BAV score for each of the plurality of agents; and displaying the one or more additional profiles via the visualization.

\* \* \* \* \*